US010226953B2

(12) United States Patent
Matsumura

(10) Patent No.: US 10,226,953 B2
(45) Date of Patent: Mar. 12, 2019

(54) PRINTING CONTROL DEVICE AND PRINTING CONTROL METHOD

(71) Applicant: SEIKO EPSON CORPORATION, Tokyo (JP)

(72) Inventor: Tetsuya Matsumura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/493,200

(22) Filed: Apr. 21, 2017

(65) Prior Publication Data
US 2017/0217233 A1 Aug. 3, 2017

Related U.S. Application Data

(63) Continuation of application No. 15/193,520, filed on Jun. 27, 2016, now Pat. No. 9,662,916.

(30) Foreign Application Priority Data

Jul. 3, 2015 (JP) ................. 2015-134361

(51) Int. Cl.
B41J 25/308 (2006.01)
B41J 2/14 (2006.01)
B41J 11/42 (2006.01)
H04N 1/52 (2006.01)

(52) U.S. Cl.
CPC ............... B41J 25/308 (2013.01); B41J 2/14 (2013.01); B41J 11/425 (2013.01); H04N 1/52 (2013.01)

(58) Field of Classification Search
CPC .... B41J 25/304; B41J 25/308; B41J 25/3056; B41J 11/008
See application file for complete search history.

(56) References Cited

U.S. PATENT DOCUMENTS 7,258,409 B2 8/2007 Kunihiro
8,348,368 B2 1/2013 Kim et al.
2013/0050339 A1* 2/2013 Lahut ..................... B41J 2/2132 347/43
2013/0300795 A1 11/2013 Ogasawara

FOREIGN PATENT DOCUMENTS

JP 2003-053957 A 2/2003
JP 2013-233708 A 11/2013

* cited by examiner

Primary Examiner — Juanita D Jackson

(57) ABSTRACT

A sub-scanning distance in a case in which a gap between a recording head and a platen is broader than a second gap broader a first gap is lengthened more than a sub-scanning distance in a case in which the gap is the first gap more when sub-scanning which is sub-scanning of a longer distance than a pitch of nozzles of a nozzle line in a sub-scanning direction is performed. A sub-scanning distance in a case in which the record density of a print image of a specific print region is second record density higher than first record density may also be lengthened more than a sub-scanning distance in a case in which the record density is the first record density when the sub-scanning which is the sub-scanning of the longer distance than the pitch of the nozzles of the nozzle line in the sub-scanning direction is performed.

7 Claims, 21 Drawing Sheets

BAND PRINTING

FIG. 6

TABLE T1

| PRINTING MODE | PLATEN GAP (g) | FEEDING AMOUNT Xpg |
|---|---|---|
| NORMAL SINGLE-SIDE PRINTING | gp1 | Xp1 |
| NORMAL DOUBLE-SIDE PRINTING | gp2 | Xp2 |
| ENVELOPE PRINTING | gp3 | Xp3 |
| ... | ... | ... |

(gp1<gp2<gp3)  (Xp1<Xp2<Xp3)

PARTIAL OVERLAP PRINTING

PSEUDO-BAND PRINTING (THE SAME APPLIES BELOW)

COMPARATIVE EXAMPLE

COMPARATIVE EXAMPLE

PRINTING CONTROL DEVICE AND PRINTING CONTROL METHOD

CROSS-REFERENCE TO RELATED APPLICATIONS

This application is a continuation application of U.S. patent application Ser. No. 15/193,520 filed on Jun. 27, 2016. This application claims priority under 35 U.S.C. § 119 to Japanese Patent Application No. 2015-134361, filed Jul. 3, 2015. The entire disclosures of U.S. patent application Ser. No. 15/193,520 and Japanese Patent Application No. 2015-134361 are hereby incorporated herein by reference.

BACKGROUND

1. Technical Field

The present invention relates to a printing control device and a printing control method.

2. Related Art

Ink jet printers, for example, dots are formed on print substrates by relatively moving recording heads having nozzle lines in which a plurality of nozzles are arranged in predetermined nozzle line directions relative to the print substrates in relative movement directions intersecting the nozzle arrangement directions and ejecting ink droplets (liquid droplets) from the nozzles according to nozzle data that indicates presence or absence of an ink dot for each pixel. Ink jet printers in which main scanning and sub-scanning are repeated include, for example, serial printers in which high-speed printing such as band printing is performed and serial printers in which pseudo-band printing is performed. Here, the band printing is a printing scheme of forming all of the dots of a band having a length corresponding to a one-time feed amount (also referred to as a transport amount) of a print substrate in a sub-scanning direction through one-time main scanning. The pseudo-band printing is a printing scheme of forming all of the dots of a band, which is a unit in which all of the dots are formed in a sub-scanning direction, through M-time main scanning (where M is an integer equal to or greater than 2). Sub-scanning between main scanning at the time of formation of dots of equal bands is a feed amount corresponding to 1/M of a pitch of nozzles in a sub-scanning direction.

There is a possibility of banding (stripes formed in a main scanning direction) occurring in boundaries of bands due to a transport error of a print substrate or a landing error of dots between the bands. To reduce the banding, partial overlap printing is performed in which print regions, where print images are formed at the time of main scanning performed before and after sub-scanning of a distance longer than a pitch of nozzles in a sub-scanning direction, are partially overlapped. In the partial overlap printing, recording of the overlapped overlap regions is divided into main scanning before the sub-scanning and main scanning after the sub-scanning.

JP-A-2003-53957 (particularly, summary and claims 2 to 4) discloses an ink jet recording apparatus that is capable of adjusting a distance interval between a recording head and a recording medium by rotation of an eccentric shaft. The ink jet recording apparatus calculates a value of $(10 \times v2)/(d \times r)$ by adding an ink ejection speed v2 [mm/s] and a record density r [dot/mm] of the recording head and suppresses a scanning speed v1 of the recording head so that $v1 \leq (10 \times v2)/(d \times r)$ is satisfied.

Of requests for improving a printing speed, it has turned out that a landing range of an ink droplet is extended in a sub-scanning direction when the speed of main scanning of the recording head is increased. When the landing range is extended, for example, at the time of band printing, mutually adjacent bands are partially overlapped and dark stripes in the main scanning direction occur in some cases. Such dark stripes occur in some cases irrespective of whether overlap printing is performed, and thus pseudo-band printing or the like occurs in some cases.

The foregoing problems similarly occur in various apparatuses.

SUMMARY

An advantage of some aspects of the invention is that it provides a technology for suppressing banding.

According to an aspect of the invention, there is provided a printing control device for a printing unit that is capable of adjusting a gap g between a recording head having a nozzle line in which a plurality of nozzles are arranged in a different direction from a main scanning direction and a platen facing the recording head and supporting a print substrate and performs main scanning to move the recording head in the main scanning direction with respect to the print substrate and sub-scanning to move the print substrate in a sub-scanning direction relative to the recording head. The printing control device includes a sub-scanning control unit that lengthens a sub-scanning distance in a case in which the gap g is a second gap broader than a first gap more than a sub-scanning distance in a case in which the gap g is the first gap when sub-scanning which is sub-scanning of the same printing scheme and is sub-scanning of a longer distance than a pitch of the nozzles of the nozzle line in the sub-scanning direction is performed.

According to the above-described aspects, it is possible to provide a technology capable of suppressing banding.

The aspects of the invention can be applied to a printing apparatus including the printing control device, a printing method including the printing control method, a printing control program causing a computer to realize functions corresponding to the above-described constituent elements, a printing program including the printing control program, and a computer-readable medium recording such programs. The above-described device may be configured of a plurality of distributed portions.

BRIEF DESCRIPTION OF THE DRAWINGS

The invention will be described with reference to the accompanying drawings, wherein like numbers reference like elements.

FIG. 6 is a diagram schematically illustrating an example of the structure of a platen gap table.

DESCRIPTION OF EXEMPLARY EMBODIMENTS

Hereinafter, an embodiment of the invention will be described. Of course, the following embodiment is merely an example of the invention and all of the characteristics described in the embodiment may not be said to be requisites for solutions of the invention.

(1) Overview of Technology

An overview of the present technology will be described with reference to FIGS. 1 to 21. FIGS. 1 to 21 are schematically illustrated diagrams and some of the diagrams are not conformed. For example, an ejection direction of ink droplets 67 illustrated in FIGS. 1, 2 and the like is exemplified to facilitate understanding and may not be said to be an actual ejection direction.

Aspect 1

Figure 1:
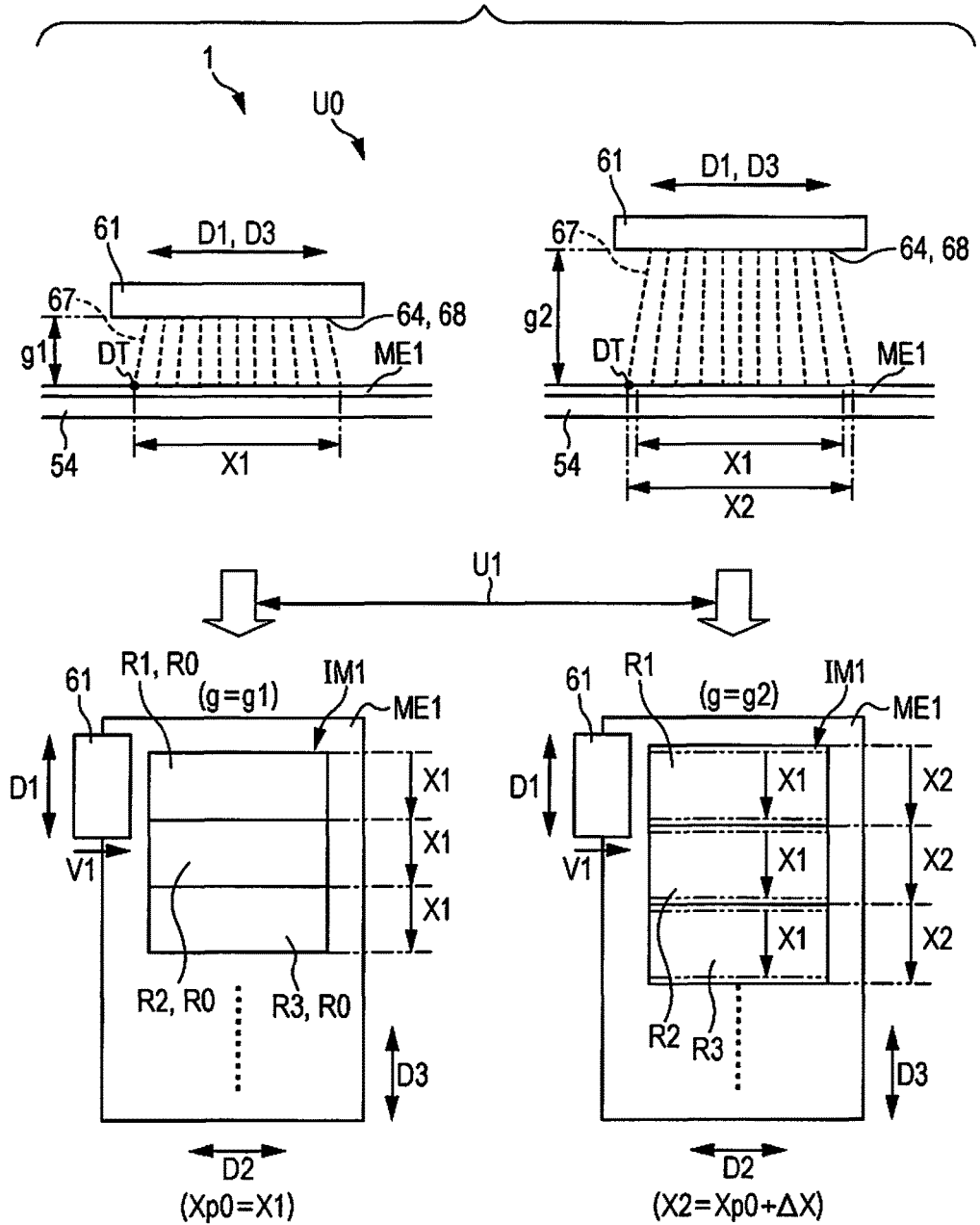
FIG. 1 is a diagram schematically illustrating an example in which a feeding amount is changed according to a platen gap.
Figure 3:
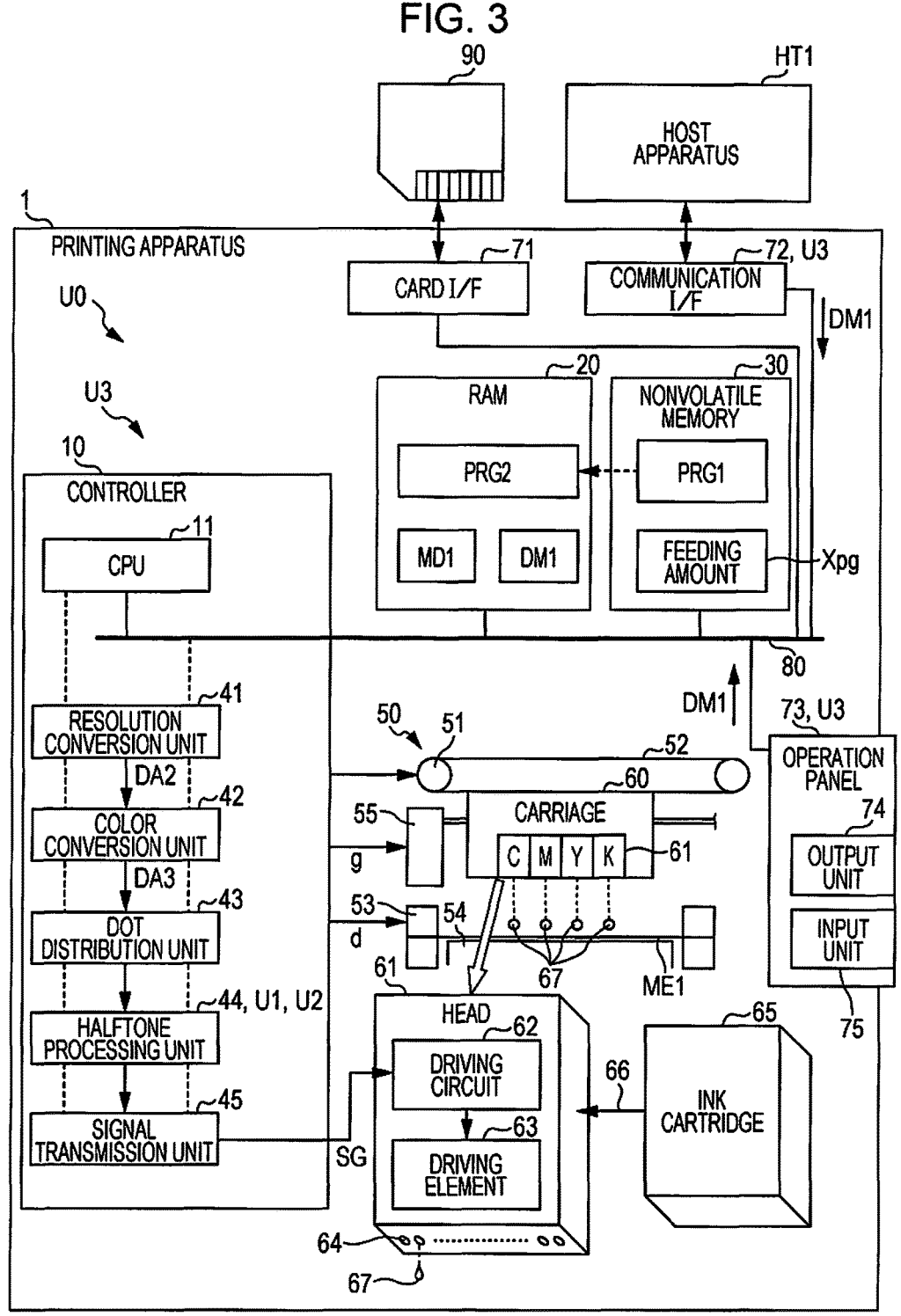
FIG. 3 is a diagram schematically illustrating an example of the configuration of a serial printer which is a printing apparatus.
Figure 4:
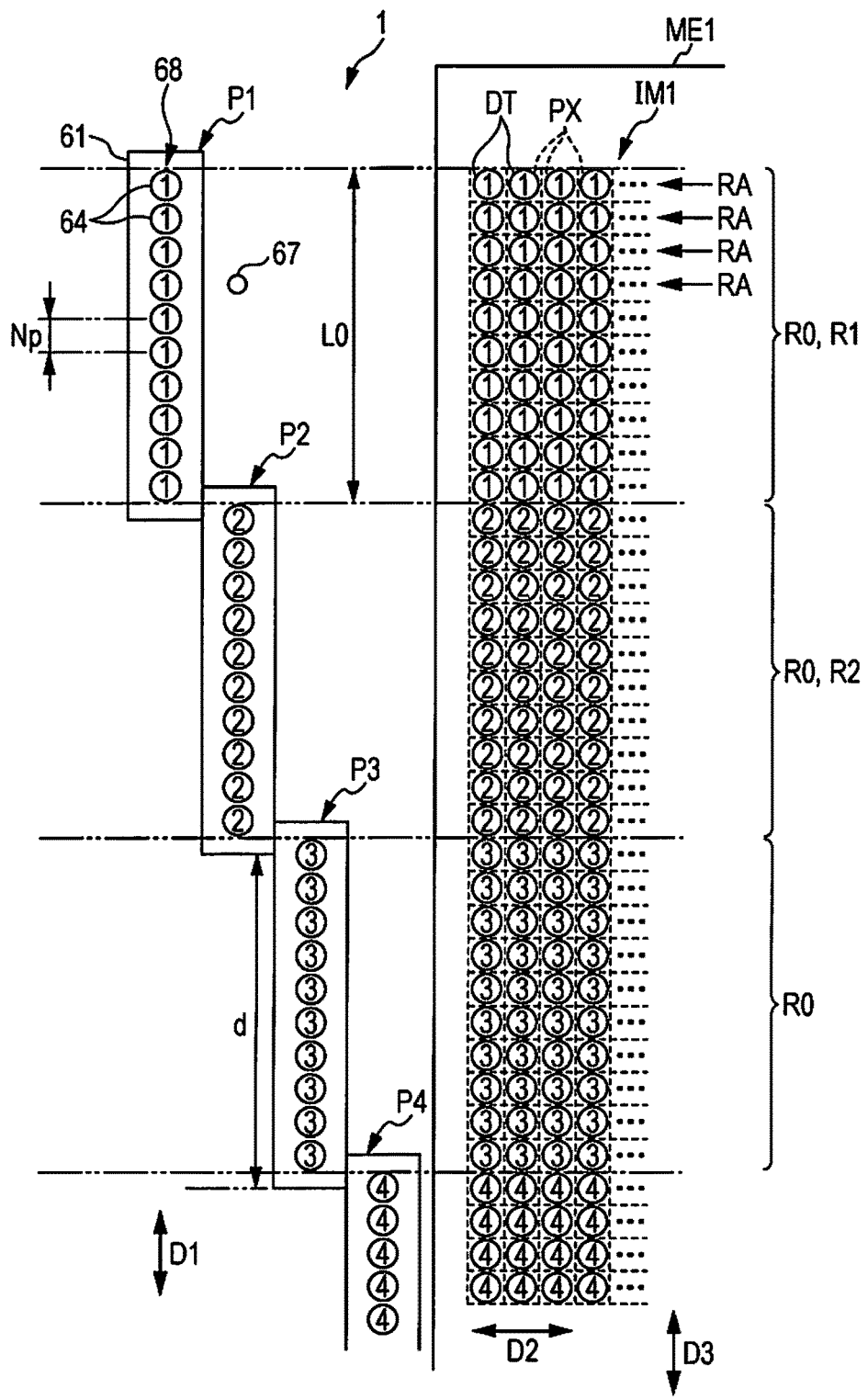
FIG. 4 is a diagram schematically illustrating an operation example of band printing.

A printing apparatus (printing unit) 1 exemplified in FIGS. 1, 3, 4, and the like can adjust a gap g between a recording head 61 having a nozzle line 68 in which a plurality of nozzles 64 are arranged in a direction (for example, an arrangement direction D1) different form a main scanning direction D2 and a platen 54 facing the recording head 61 and supporting a print substrate ME1, and performs main scanning and sub-scanning. In the main scanning, the recording head 61 is moved in the main scanning direction D2 with respect to the print substrate ME1. In the sub-scanning, the print substrate ME1 is relatively moved in the sub-scanning direction D3 with respect to the recording head 61. A sub-scanning control unit U1 included in a printing control device U0 lengthens a sub-scanning distance in a case in which the gap g is a second gap g2 broader than a first gap g1 more than a sub-scanning distance in a case in which the gap g is the first gap g1 when sub-scanning which is sub-scanning of the same printing scheme and is sub-scanning of a longer distance d than a pitch Np of the nozzles 64 of the nozzle line 68 in the sub-scanning direction D3 is performed.

A printing control method for the printing unit includes a sub-scanning control step corresponding to the sub-scanning control unit U1.

Figure 20:
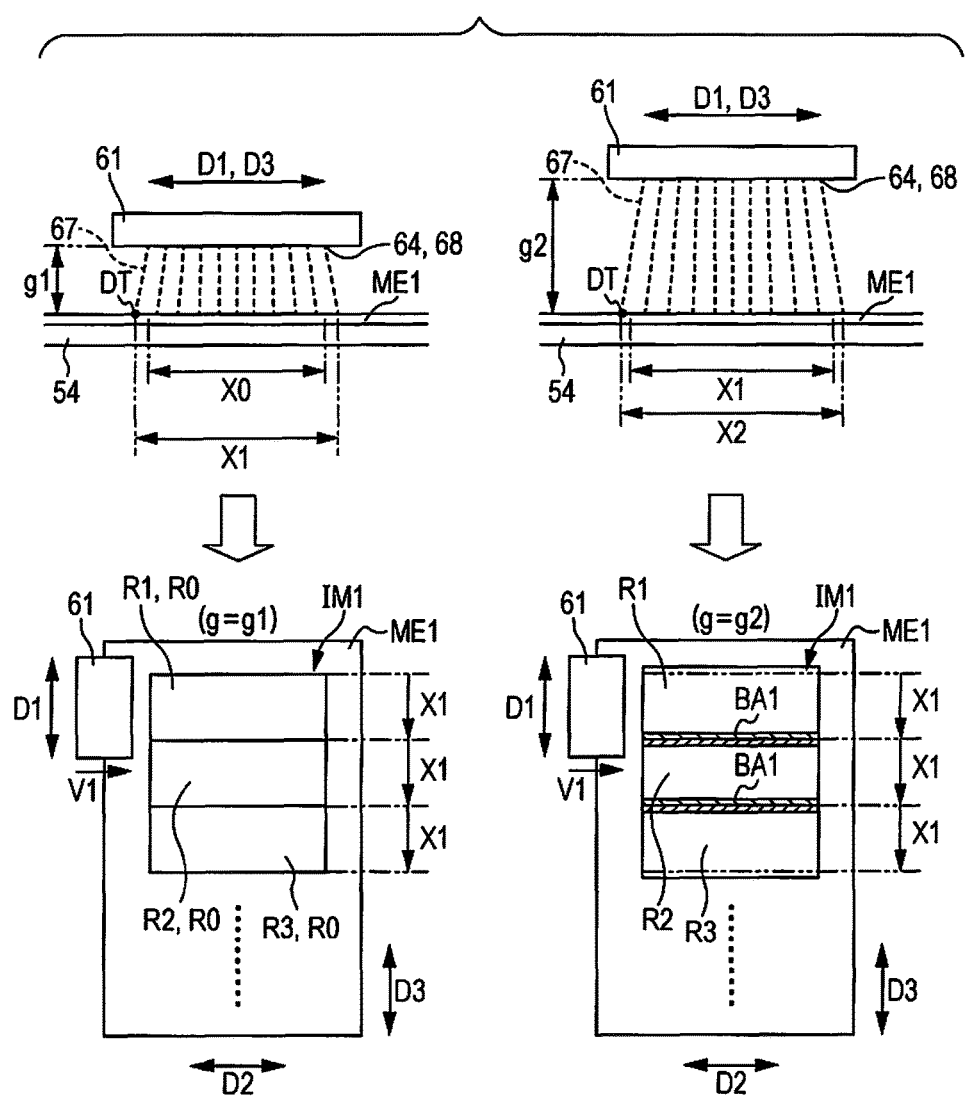
FIG. 20 is a diagram schematically illustrating a form of occurrence of banding according to a platen gap at the time of band printing in a comparative example.

FIG. 20 schematically illustrates a range in which dots DT are formed with ink droplets 67 ejected from the recording head 61 to the print substrate ME1 at the time of band printing in a serial printer according to a comparative example. On the upper side of FIG. 20, forms of the ink droplets 67 ejected from the nozzle line 68 when viewed in the main scanning direction D2 are indicated by dotted lines. On the lower side of FIG. 20, a form of a print image IM1 formed at the time of band printing of a feeding amount X1 is illustrated. On the left side, a form of a case in which the distance (platen gap) g between the recording head 61 and the platen 54 is g1 (where g1>0) is illustrated. On the right side, a form of a case in which the platen gap (g) is increased to g2 (where g2>g1) is illustrated. Here, reference numeral D1 denotes an arrangement direction of the nozzles 64 of the nozzle line 68 and reference numeral D3 denotes sub-scanning direction. In band printing, a print image IM1 of each of print regions R1, R2, R3, etc. is formed in each main scanning.

As illustrated on the upper left side of FIG. 20, a landing range of ink droplets in the sub-scanning direction D3 is assumed to be an ideal range X0 when the ink droplets 67 are ejected from all the nozzles 64 of the nozzle line 68 in a designed direction. When a movement speed of the recording head 61 is slow at the time of the main scanning in which the ink droplets 67 are ejected, a band width (a length in the sub-scanning direction D3) of a print region R0 in which the print image IM1 is formed in one-time main scanning is substantially the ideal range X0. However, when the recording head 61 is moved at a high speed V1 (mm/s) at the time of main scanning, air flows and elude the ink droplets 67 repeatedly ejected from the plurality of nozzles 64, and thus flows in directions in which the ink droplets 67 ejected from the nozzles at the ends of the nozzle line 68 in the sub-scanning direction D3 are extended. On the upper left side of FIG. 20, the landing range of the ink droplets becomes a range X1 broader than the ideal range X0 when the platen gap is g1. Accordingly, in order to link the print regions R0 without excess or deficiency, a one-time feeding amount is considered to be set to X1, as illustrated on the lower left side of FIG. 20.

The platen gap (g) is changed according to the thickness of the print substrate ME1 in some cases and is changed according to single-side printing or double-side printing in some cases. In a case in which the platen gap is extended to g2, the landing range of the ink droplets is extended to X2 (where X2>X1) when the recording head 61 is moved at a high speed V1, as illustrated on the upper right of FIG. 20. When a one-time feeding amount is set to X1, print regions are partially overlapped, as illustrated on the lower right side of FIG. 20, and thus overlap portions are shown as dark stripes BA1 (black stripes in case of black ink), that is, banding. Here, when the ejection speed of the ink droplets 67 from the nozzles 64 is increased to suppress the dark stripes BA1, an air stream (wind) is generated in the ink droplets 67 at a high speed and a "wind ripple" phenomenon in which a stripe of ground color with a curve shape is shown may occur. Accordingly, there is a limit to the increase in the ejection speed of the ink droplets 67.

FIG. 1 schematically illustrates a range in which the dots DT are formed with the ink droplets 67 ejected from the recording head 61 to the print substrate ME1 at the time of band printing in the printing control device U0 according to the present technology. On the upper side of FIG. 1, forms of the ink droplets 67 ejected from the nozzle line 68 when viewed in the main scanning direction D2 is indicated by dotted lines. On the lower side of FIG. 1, a form of a print image IM1 formed at the time of band printing is illustrated. On the left side, a form of a case in which a distance (platen gap) g between the recording head 61 and the platen 54 is a first gap g1 (where g1>0) is illustrated. On the right side, a form of case in which the platen gap (g) is increased to a second gap g2 (where g2>g1) is illustrated.

In a case in which the platen gap is g1, the sub-scanning control unit U1 controls a sub-scanning distance longer than the pitch Np of the nozzles 64 of the nozzle line 68 in the sub-scanning direction D3 to a first distance X1. On the other hand, in a case in which the platen gap is g2 (where g2>g1), the sub-scanning control unit U1 controls a sub-scanning distance longer than the pitch Np of the nozzles 64 of the nozzle line 68 in the sub-scanning direction D3 to a second distance X2 (where X2>X1). Accordingly, the dark stripes BA1 shown in FIG. 20 are suppressed.

Accordingly, according to the present aspect, it is possible to provide a technology capable of suppressing banding occurring in the platen gap.

Here, a nozzle is a small hole projecting an ink droplet. The ink droplet includes an uncolored ink such as an ink droplet for improving image quality.

A print substrate is a material that maintains a print image. The shape of a print substrate is generally rectangular, but includes a circle (for example, an optical disc such as a CD-ROM or a DVD), a triangle, a square, or a polygon and all of products and processed products of sheets and sheet boards disclosed in at least JIS (Japanese Industrial Standards) P0001: 1998 (terms of sheets, sheet boards, and pulps). For example, resin sheets, metal plates, and three-dimensional objects are included in print substrates.

The relative movement of the print substrate to the recording head includes movement of the print substrate without movement of the recording head, movement of the recording head without movement of the print substrate, and movement of both the print substrate and the recording head.

The relative change in a sub-scanning distance at the time of performing the sub-scanning of the same printing scheme means a change in a sub-scanning distance at the time of performing the sub-scanning of band printing when a first condition is changed to a second condition, with respect to a sub-scanning distance at the time of performing the sub-scanning of the band printing in the first condition in a case in which a printing scheme is the band printing.

Aspect 2

Figure 2:
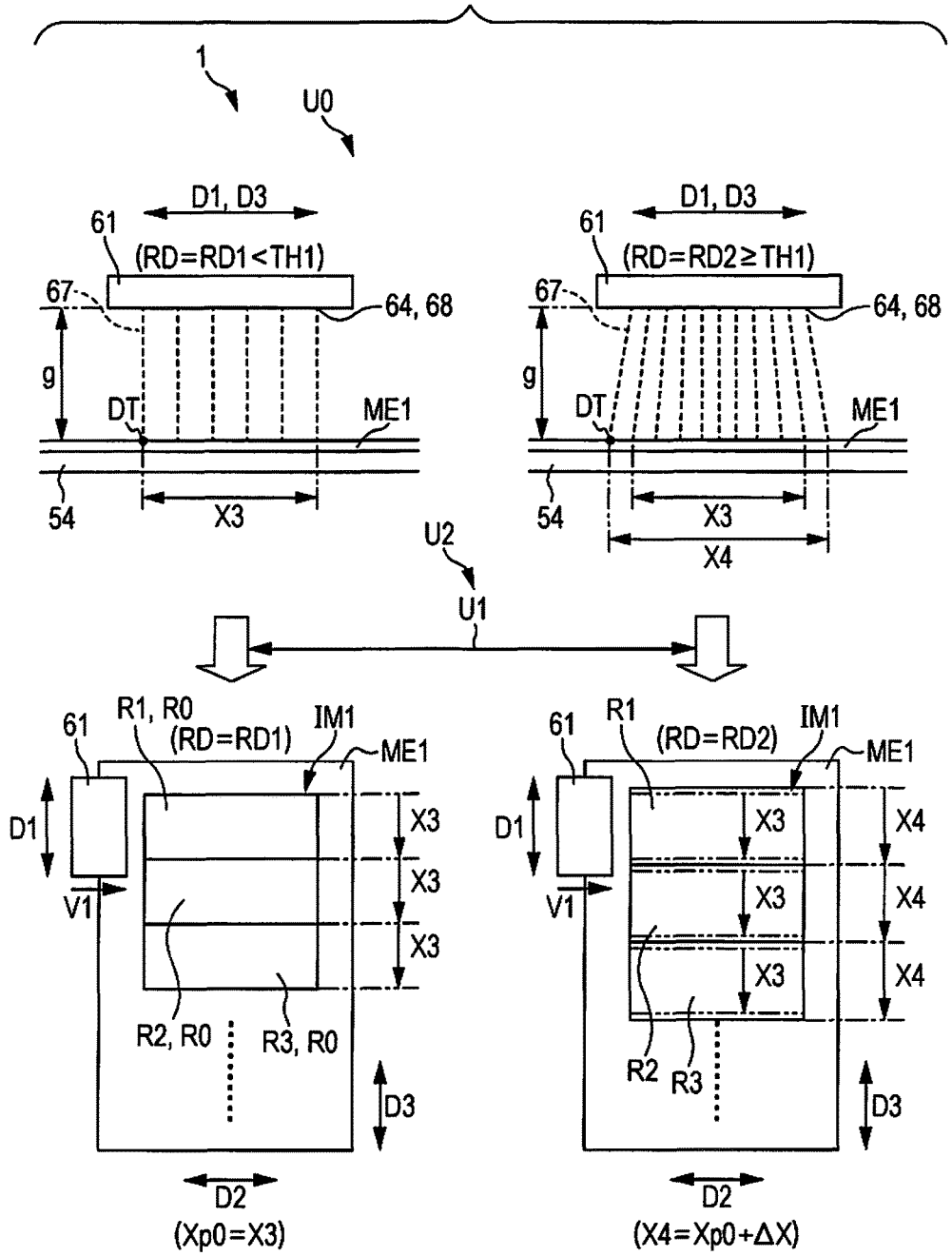
FIG. 2 is a diagram schematically illustrating an example in which a feeding amount is changed according to record density.

The printing apparatus (printing unit) 1 exemplified in FIGS. 2 to 4 and the like performs the main scanning and the sub-scanning to form the print image IM1 corresponding to print data DA1. In the main scanning, the nozzle line 68 in which the plurality of nozzles 64 are arranged in a direction (for example, an arrangement direction D1) different from the main scanning direction D2 is moved in the main scanning direction D2 with respect to the print substrate ME1. In the sub-scanning, the print substrate ME1 is moved in the sub-scanning direction D3 relative to the nozzle line 68. A record density acquisition unit U2 included in the printing control device U0 acquires record density RD of the print image IM1 in a specific print region in which the print image IM1 is formed at the time of final main scanning before the sub-scanning of the longer distance than the pitch Np of the nozzles 64 of the nozzle line 68 in the sub-scanning direction D3 based on the print data DA1. For example, print regions R1, R2, R3, etc. sequentially become the specific print region at the time of band printing, and bands B1, B2, B3, etc. sequentially become the specific print region at the time of pseudo-band printing illustrated in FIG. 19. In the case of the pseudo-band printing, for example, the sub-scanning between the bands B1 and B2 is sub-scanning longer than the nozzle pitch, and the final main scanning before this sub-scanning is main scanning of pass 2. The sub-scanning control unit U1 included in the printing control device U0 lengthens a sub-scanning distance in a case in which the record density RD is second record density RD2 higher than first record density RD1 more than a sub-scanning distance in a case in which the record density RD is the first record density RD1 when the sub-scanning which is the sub-scanning of the same printing scheme and is the sub-scanning of the longer distance d than the pitch Np of the nozzles 64 of the nozzle line 68 in the sub-scanning direction D3 is performed. Here, the record density RD means the number of dots formed with respect to a predetermined number of pixels and means a ratio of dots when the dots are converted into largest dots (for example, large dots) in a case in which dots with different sizes are formed. For example, in a case in which Nd large dots are formed with respect to 100 pixels, the record density RD is Nd %.

Further, the printing control method for the printing unit includes a record density acquisition step corresponding to the record density acquisition unit U2 and a sub-scanning control step corresponding to the sub-scanning control unit U1.

Figure 21:
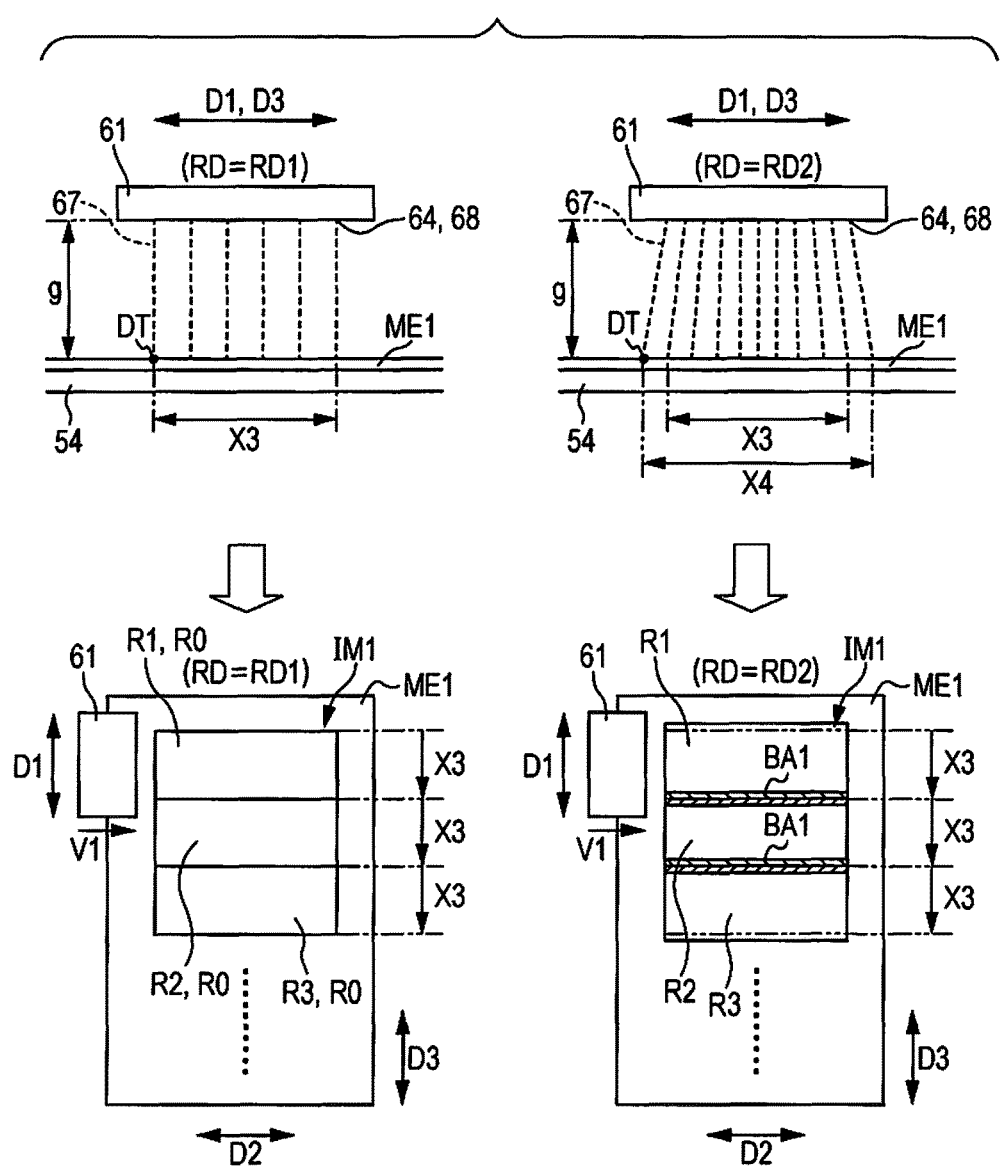
FIG. 21 is a diagram schematically illustrating a form of occurrence of banding according to a record density at the time of band printing in a comparative example.

FIG. 21 schematically illustrates a range in which dots DT are formed with ink droplets 67 ejected from the recording head 61 to the print substrate ME1 at the time of band printing in a serial printer according to a comparative example. On the upper side of FIG. 21, forms of the ink droplets 67 ejected from the nozzle line 68 when viewed in the main scanning direction D2 are indicated by dotted lines. On the lower side of FIG. 21, a form of a print image IM1 formed at the time of band printing of a feeding amount X1 is illustrated. On the left side, a case in which the record density RD is the first record density RD1 is illustrated. On the right side, a case in which the record density RD is increased to the second record density RD2 (where 0%<RD1<RD2≤100%) is illustrated.

As illustrated on the upper left side of FIG. 21, in a case in which the record density RD is the relatively low first record density RD1 (for example, 50%), the flow of air eluding the ink droplets 67 is relatively weak when the recording head 61 at the time of the main scanning is moved at the high speed V1, and the air rarely flows in a direction in which the ink droplets 67 are extended in the sub-scanning direction D3. Here, in order to link the print regions R0 without excess or deficiency, a one-time feeding amount is considered to be set to X3, as illustrated on the lower left side of FIG. 21. As illustrated on the upper right side of FIG. 21, however, in a case in which the record density RD is the relatively high second record density RD2 (for example, 100%), the flow of air eluding the ink droplets 67 is relatively strong when the recording head 61 at the time of the main scanning is moved at the high speed V1, and the air easily flows in the direction in which the ink droplets 67 are extended in the sub-scanning direction D3. On the upper right side of FIG. 21, the landing range of the ink droplets is extended to X4 (where X4>X3). When the one-time feeding amount is set to X3, as illustrated on the lower right side of FIG. 21, the print regions are partially overlapped and the overlap portions are shown as the dark stripes BA1, that is, banding. Here, when the ejection speed of the ink droplets 67 from the nozzles 64 is increased to suppress the dark stripes BA1, the "wind ripple" phenomenon may also occur. Therefore, there is a limit on the increase in the ejection speed of the ink droplets 67.

FIG. 2 schematically illustrates a range in which the dots DT are formed with the ink droplets 67 ejected from the recording head 61 to the print substrate ME1 at the time of band printing in the printing control device U0 according to the present technology. On the upper side of FIG. 2, forms of the ink droplets 67 ejected from the nozzle line 68 when viewed in the main scanning direction D2 are indicated by dotted lines. On the lower side of FIG. 2, a form of a print image IM1 formed at the time of band printing is illustrated. On the left side, a form of a case in which the record density RD is the first record density RD1 is illustrated. On the right side, a form of a case in which the record density RD is increased to the second record density RD2 (0%<RD1<RD2≤100%) is illustrated.

In a case in which the record density RD acquired by the record density acquisition unit U2 is the relatively low first record density RD1, the sub-scanning control unit U1 controls the distance of the sub-scanning longer than the pitch Np of the nozzles 64 of the nozzle line 68 in the sub-scanning direction D3 to the first distance X3. On the other hand, in a case in which the record density RD acquired by the record density acquisition unit U2 is the relatively high second record density RD2, the sub-scanning control unit U1 controls the distance of the sub-scanning longer than the pitch Np of the nozzles 64 of the nozzle line 68 in the sub-scanning direction D3 to a second distance X4 (where X4>X3). Accordingly, the dark stripes BA1 illustrated in FIG. 21 are suppressed.

Accordingly, according to the present aspect, it is possible to provide a technology capable of suppressing banding occurring in the record density.

Here, the relative movement of the print substrate to the nozzle line includes movement of the print substrate without movement of the nozzle line, movement of the nozzle line without movement of the print substrate, and movement of both the print substrate and the nozzle line.

Aspect 3

Incidentally, the sub-scanning control unit U1 may acquire a correction value for correcting a standard distance Xp0 of the sub-scanning based on the record density RD and control the sub-scanning so that the standard distance Xp0 becomes a distance corrected by the correction value when the sub-scanning which is the sub-scanning of the same printing scheme and is the sub-scanning of the longer distance d than the pitch Np of the nozzles 64 of the nozzle line 68 in the sub-scanning direction D3 is performed. According to the present aspect, it is possible to provide a technology capable of further suppressing the banding occurring according to the record density.

Figure 12:
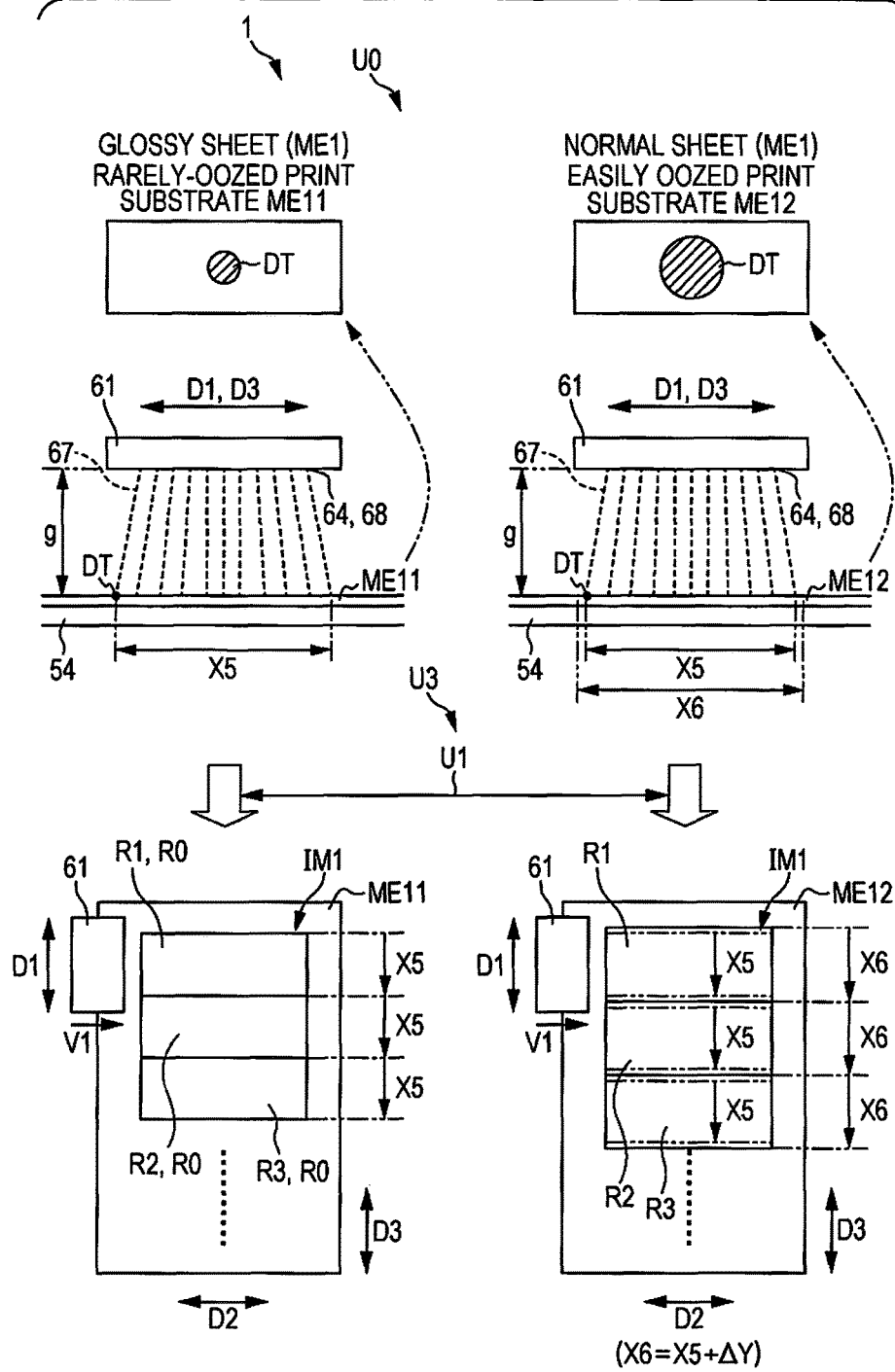
FIG. 12 is a diagram schematically illustrating an example in which a feeding amount is changed according to the type of print substrate.
Figure 14:
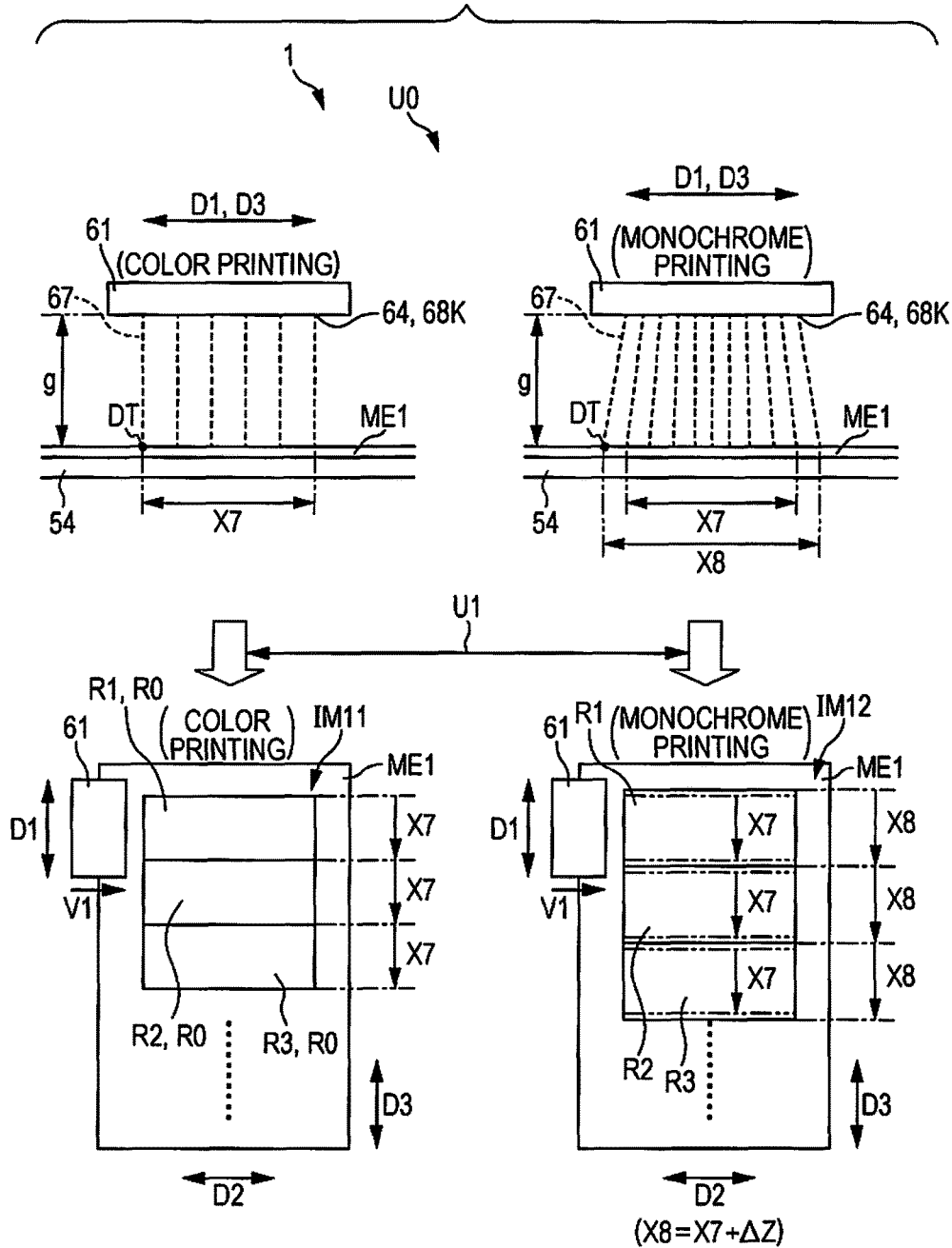
FIG. 14 is a diagram schematically illustrating an example in which a feeding amount is changed according to the color of print image.
Figure 16:
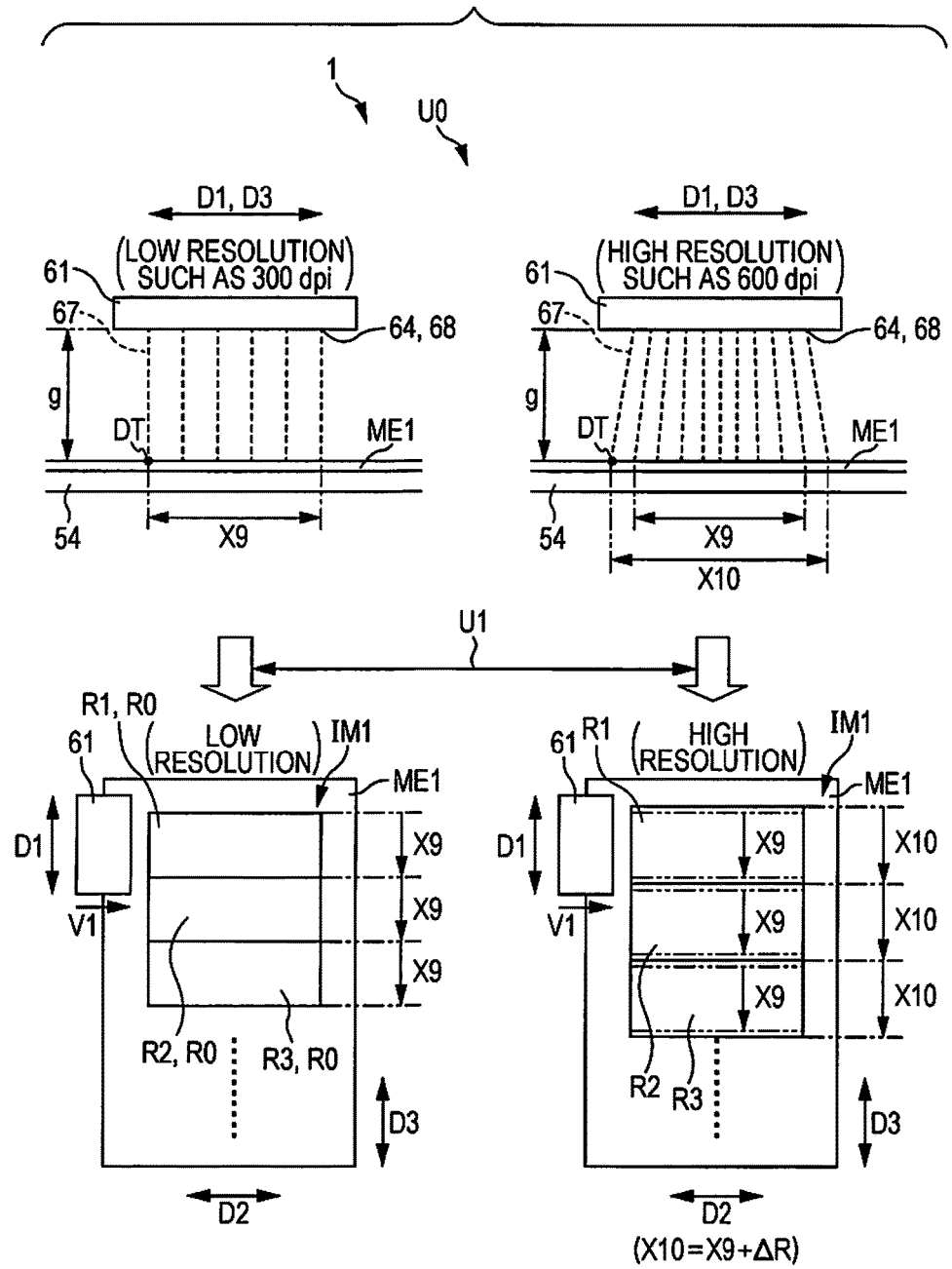
FIG. 16 is a diagram schematically illustrating an example in which a feeding amount is changed according to a print resolution.

Here, the correction value includes a correction value ΔX illustrated in FIGS. 1, 2, and the like, a correction value ΔY illustrated in FIG. 12 and the like, a correction value ΔZ illustrated in FIG. 14 and the like, and a correction value ΔR illustrated in FIG. 16 and the like.

Aspect 4

Figure 13:
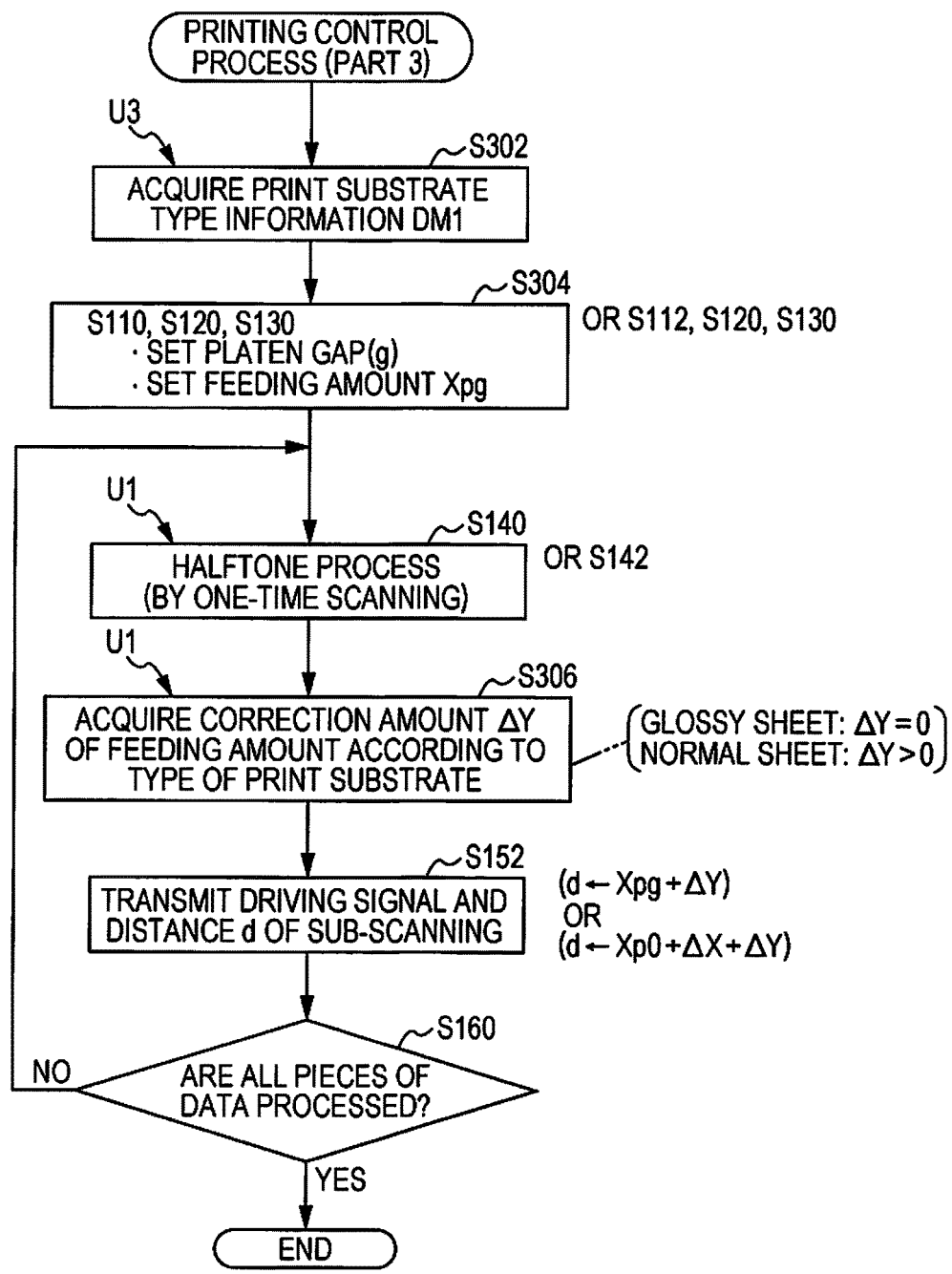
FIG. 13 is a flowchart illustrating still another example of a printing control process.

As illustrated in FIGS. 12, 13, and the like, the printing control device U0 may further include a print substrate type acquisition unit U3 that acquires print substrate type information DM1 indicating a type of print substrate ME1 supported by the platen 54. The sub-scanning control unit U1 may lengthen a sub-scanning distance in a case in which the print substrate ME1 indicated by the print substrate type information DM1 is a second print substrate ME12 (for example, a glossy sheet), in which permeation is easier than a first print substrate ME11 (for example, a normal sheet), more than a sub-scanning distance in a case in which the print substrate ME1 indicated by the print substrate type information DM1 is the first print substrate ME11 when the sub-scanning which is the sub-scanning of the same printing scheme and is the sub-scanning of the longer distance d than the pitch Np of the nozzles 64 of the nozzle line 68 in the sub-scanning direction D3 is performed. According to the present aspect, it is possible to provide a technology capable of suppressing banding occurring according to the type of print substrate.

A printing control method for the printing unit includes a print substrate type acquisition step corresponding to the print substrate type acquisition unit U3.

Aspect 5

Figure 15:
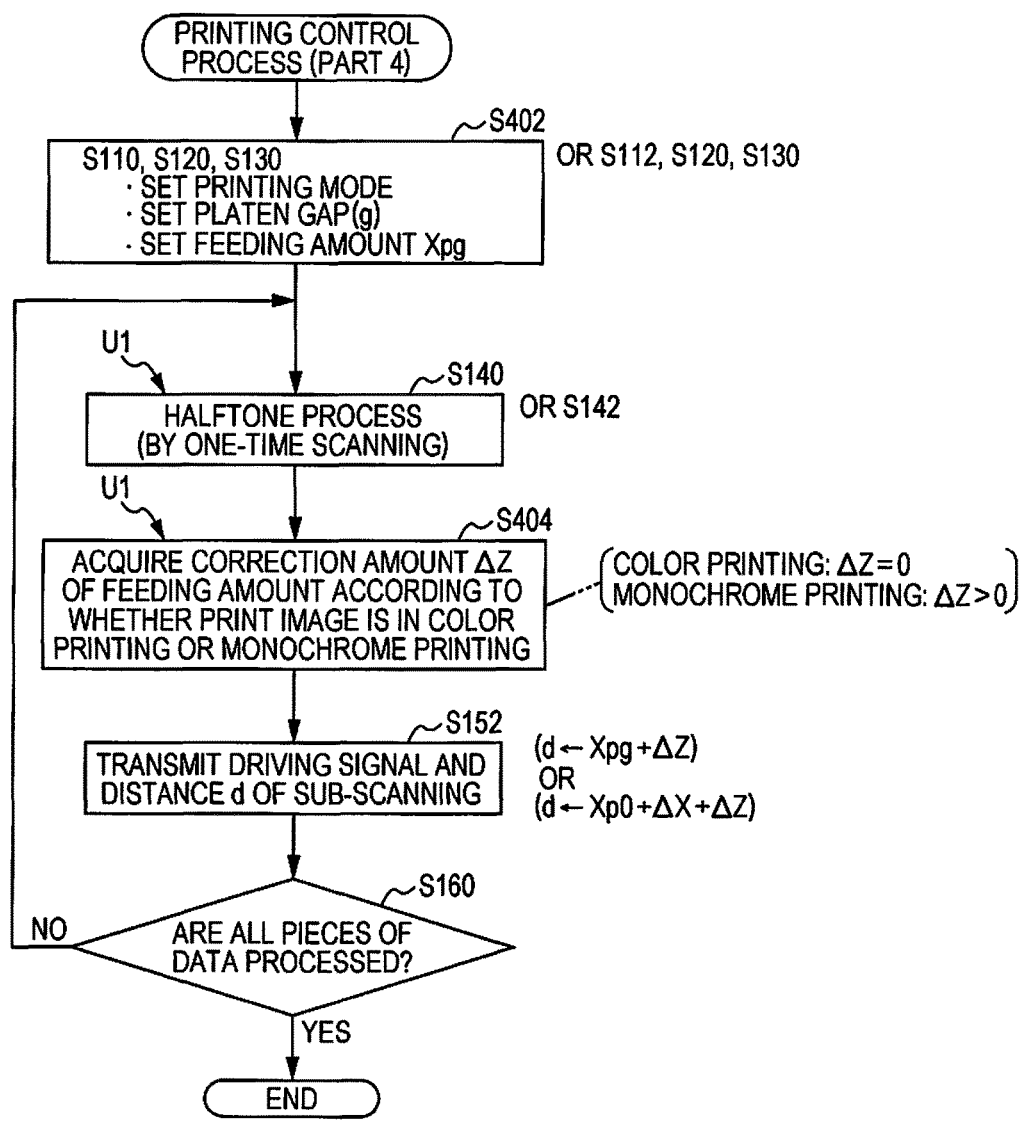
FIG. 15 is a flowchart illustrating still another example of a printing control process.

As illustrated in FIGS. 14, 15, and the like, the sub-scanning control unit U1 may lengthen a sub-scanning distance in a case in which a monochromic print image IM12 is formed more than a sub-scanning distance in a case in which a color print image IM11 is formed when the sub-scanning which is the sub-scanning of the same printing scheme and is the sub-scanning of the longer distance d than the pitch Np of the nozzles 64 of the nozzle line 68 in the sub-scanning direction D3 is performed. According to the present aspect, it is possible to provide a technology capable of suppressing banding occurring according to whether the print image is a color or monochromic print image.

Here, the monochromic print image includes not only an image formed with only achromatic ink without using chromatic ink but also a monochromatic print image in which chromatic ink such as a sepia tone, a warn tone, or a cool tone is used together.

Aspect 6

Figure 17:
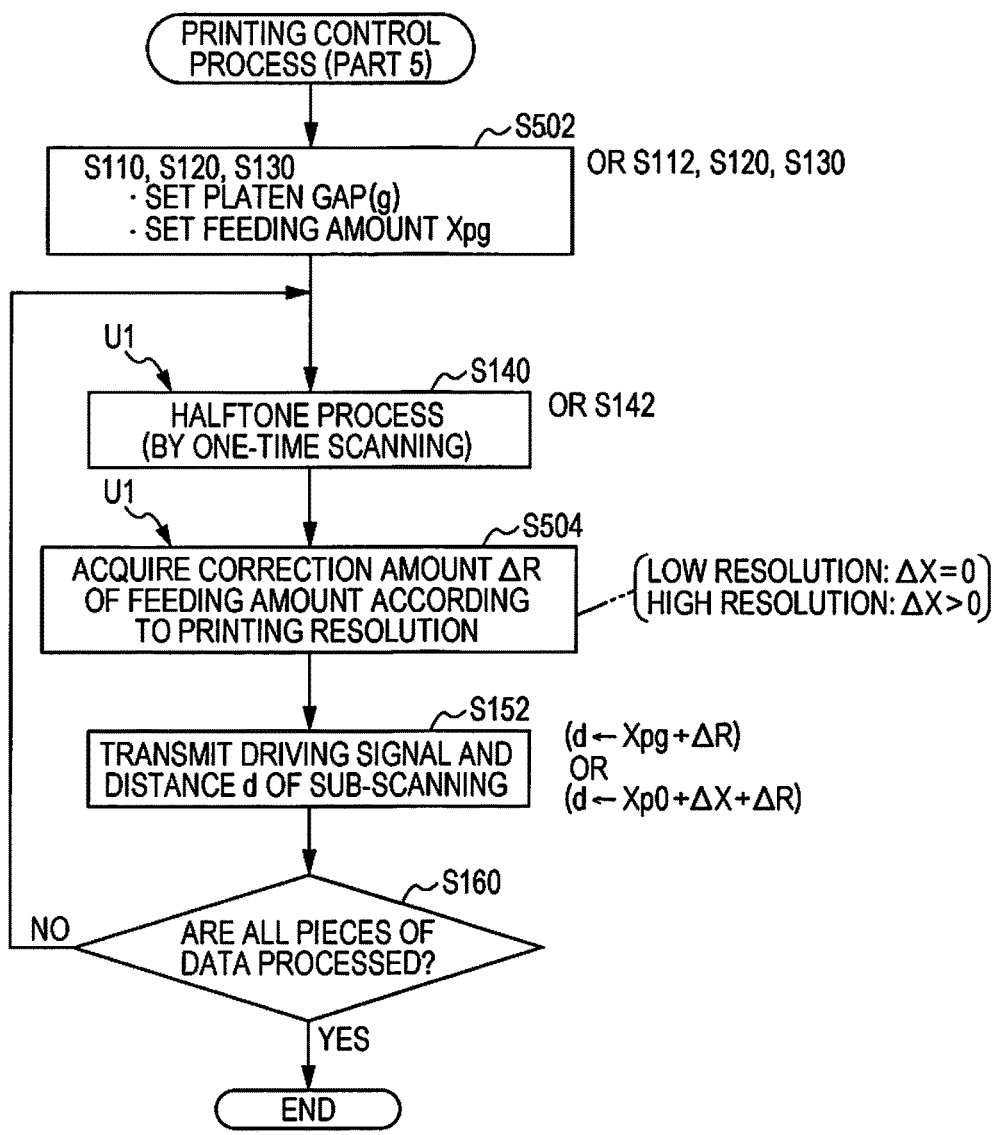
FIG. 17 is a flowchart illustrating still another example of a printing control process.

As illustrated in FIGS. 16, 17, and the like, the sub-scanning control unit U1 may lengthen a sub-scanning distance in a case in which a print resolution in the sub-scanning direction D3 is a second resolution (for example, 600 dpi) higher than a first resolution (for example, 300 dpi) more than a sub-scanning distance in a case in which the print resolution is the first resolution when the sub-scanning which is the sub-scanning of the same printing scheme and is the sub-scanning of the longer distance d than the pitch Np of the nozzles 64 of the nozzle line 68 in the sub-scanning direction D3 is performed. According to the present aspect, it is possible to provide a technology capable of suppressing banding occurring according to the resolution.

(2) Specific Example of Configuration of Printing Apparatus

FIG. 3 schematically illustrates an example of the configuration of a serial printer which is a kind of ink jet printer as the printing apparatus (printing unit) 1 that realizes the operation examples illustrated in FIGS. 1 and 2. FIG. 4 schematically illustrates an operation example of band printing. The printing apparatus 1 internally includes a printing unit in which the recording head (printing head) 61 and the print substrate ME1 are relatively moved and a printing control device U0 that controls the printing unit. The printing apparatus 1 repeats main scanning in which the recording head 61 and the print substrate ME1 are relatively moved in the main scanning direction D2 and performs sub-scanning in which the recording head 61 and the print substrate ME1 are relatively moved in the sub-scanning direction D3 between the main scanning. Hereinafter, the recording head is also simply referred to as a head. In the band printing, all of the dots of each print region R0 are formed in one-time main scanning and a relative movement distance d of one-time sub-scanning is longer than the pitch Np of the nozzles 64 of the nozzle line 68 in the sub-scanning direction D3. In the printing apparatus 1 according to the present specific example, the head 61 is moved in the main scanning direction D2 without movement of the print substrate ME1 at the time of the main scanning and the print substrate ME1 is moved in the sub-scanning direction D3 at the time of the sub-scanning. The present technology can also be applied to a printing apparatus in which a head is moved in a sub-scanning direction at the time of sub-scanning.

The printing apparatus to which the present technology can be applied may be a copy machine, a facsimile, a multi-functional machine having such functions, or the like. Ink used in an ink jet printer that forms a color image includes, for example, cyan (C) ink, magenta (M) ink, yellow (Y) ink, and black (K) ink. Of course, the ink may include light cyan (Lc) ink, light magenta (Lm) ink, darky yellow (Dy) ink, light black (Lc) ink, orange (Or) ink, green (Gr) ink, and uncolored ink for an improvement in image quality.

To facilitate the description, the head 61 illustrated in FIG. 4 is assumed to have a nozzle line 68 in which 10 nozzles 64 are arranged at a predetermine pitch Np in an arrangement direction D1. The use of such a head 61 is included in the present technology. However, in practice, a head including a nozzle line that has many nozzles equal to or greater than, for example, 100 nozzles is used in many cases. Reference numeral RA denotes a raster in the main scanning direction D2, reference numeral PX denotes a pixel, reference numeral DT denotes a dot, and the nozzle 64 and the dot DT in passes P1, P2, P3, and P4 are indicated by circular numerals 1, 2, 3, and 4. The raster means a line of pixels continuing a line shape in the main scanning direction. In FIG. 4, the arrangement direction D1 and the sub-scanning direction D3 are the same, but the present technology also includes a case in which both of the directions D1 and D3 are different directions. The arrangement direction D1 and the main scanning direction D2 are orthogonal to (intersect) each other, the main scanning direction D2 and the sub-scanning direction D3 are orthogonal to (intersect) each other. However, the present technology also includes a case in which the directions may not orthogonal as long as the directions D1 and D3 are different from the main scanning direction D2.

The head 61 illustrated in FIG. 3 includes CMYK nozzles 64. FIG. 4 illustrates the nozzle line 68 including the plurality of nozzles 64 ejecting (discharging) ink droplets 67 of single color among CMYK. When exemplified more specifically, the nozzle lines 68 illustrated in FIG. 5A include a nozzle line 68C including the plurality of nozzles 64 ejecting ink droplets of C, a nozzle line 68M including the plurality of nozzles 64 ejecting ink droplets of M, a nozzle line 68Y including the plurality of nozzles 64 ejecting ink droplets of Y, and a nozzle line 68K including the plurality of nozzles 64 ejecting ink droplets of K. The nozzle lines 68C, 68M, 68Y, and 68K are arranged in the main scanning direction D2.

The present technology also includes a nozzle line in which nozzles are arranged in zigzags. In this case, the arrangement direction means a direction of arrangement of nozzles of each line in the zigzag-formed disposition. The nozzle pitch Np means a pitch of nozzles in the sub-scanning direction in all of the nozzle lines in the zigzag-formed disposition and is finer than the pitch of the nozzles of each line in the zigzag-formed disposition.

The printing apparatus 1 illustrated in FIG. 3 includes a controller 10, a random access memory (RAM) 20, a non-volatile memory 30, a mechanism unit 50, interfaces (I/F) 71 and 72, and an operation panel 73. The controller 10, the RAM 20, the nonvolatile memory 30, the I/F 71, the I/F 72, and the operation panel 73 are connected to a bus 80 so that information can be mutually input and output.

The controller 10 includes a central processing unit (CPU) 11, a resolution conversion unit 41, a color conversion unit 42, a dot distribution unit 43, a halftone processing unit 44, and a signal transmission unit 45. The halftone processing unit 44 forms the sub-scanning control unit U1 and the record density acquisition unit U2. The controller 10 forms a print substrate type acquisition unit U3 along with at least one of the operation panel 73 and the communication I/F 72. The controller 10 can be configured of a system on a chip (SoC) or the like.

The CPU 11 is a device that mainly performs information processing or control in the printing apparatus 1.

The resolution conversion unit 41 converts the resolution of an input image from a host apparatus HT1, a memory card 90, or the like into a setting resolution (for example, 600× 600 dpi or 300×300 dpi). The input image is expressed by, for example, RGB data that has integer values of 256 gray scales of RGB (read, green, and blue) in pixels. The RGB data DA2 subjected to the resolution conversion is included along with the CMYK data DA3 and halftone data DA4 in the print data DA1 according to the present technology.

Figure 7:
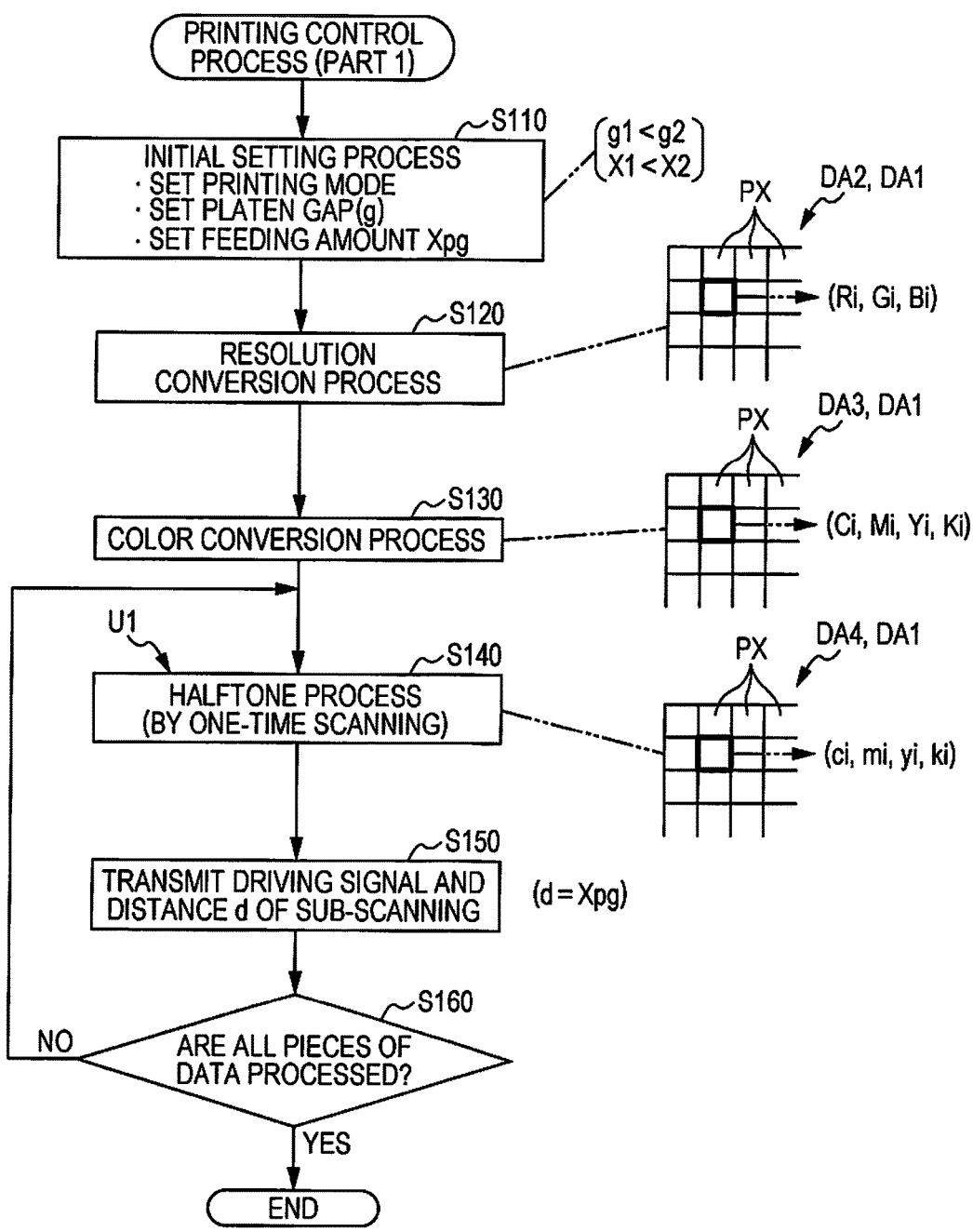
FIG. 7 is a flowchart illustrating an example of a printing control process.

FIG. 7 schematically illustrates examples of the structures of the RGB data DA2, the CMYK data DA3, and the halftone data DA4. The pixels PX of the pieces of data DA2, DA3, and DA4 are arranged methodically in the main scanning direction D2 and the sub-scanning direction D3. A gray scale value Ri of R, a gray scale value Gi of G, and a gray scale value Bi of B are stored in each pixel PX of the RGB data DA2. Here, i is a variable that identifies the pixel PX. The CMYK data DA3 is considered as, for example, gray scale data indicating a use amount of ink 66 of each pixel PX. A gray scale value Ci of C, a gray scale value Mi of M, a gray scale value Yi of Y, and a gray scale value Ki of K are stored in each pixel PX. The halftone data DA4 is considered as, for example, multivalue data indicating a formation statue of a dot of each pixel PX. A multivalue ci of C, a multivalue mi of M, a multivalue yi of Y, and a multivalue ki of K are stored in each pixel PX.

The color conversion unit 42 converts the RGB data DA2 with the setting resolution into the CMYK data DA3 having integer values of 256 gray scales of CMYK in the pixels PX with reference to, for example, a color conversion table that defines a correspondence relation between gray scale values of RGB and gray scale values of CMYK. The CMYK data DA3 is gray scale data that indicates a use amount of ink 66 of the pixels PX corresponding to the print image IM1. When a pixel i is focused on, pixel values (Ri, Gi, Bi) of the RGB data DA2 are converted into pixel values (Ci, Mi, Yi, Ki).

The dot distribution unit 43 converts the CMYK data DA3 of 256 gray scales into dot data indicating occurrence amounts of a small dot, a middle dot, and a large dot with reference to, for example, a predetermined dot distribution table. The middle dot is a larger dot than the small dot and the large dot is a larger dot than the middle dot. The sizes of the dots may be equal to or less than two kinds of sizes or may be equal to or greater than 4 kinds of sizes. The dot data is considered as, for example, gray scale data that integer values of 256 gray scales indicating the occurrence amounts of dots in the pixels PX. In a case in which one kind of size of dot is used, the dot distribution unit is not necessary.

The halftone processing unit 44 performs, for example, a predetermined halftone process such as a dither method, an error diffusion method, or a density pattern method on the gray scale values of the pixels PX that form the dot data to reduce the number of gray scales of the gray scale values and generate the halftone data DA4. The halftone data DA4 is data that indicates a formation status of the dots DT of the pixels PX corresponding to the print image IM1. The halftone data DA4 may be multivalue data with 3 or more gray scales which can correspond to the dots with different sizes such as large, middle, and small dots or may be two-value data that indicates presence or absence of formation of dots. Four-value data which can correspond to, for example, large, middle, and small dots can be set as data in which 0 corresponds to no dot, 1 corresponds to formation of a small dot, 2 corresponds to formation of a middle dot, and 3 corresponds to formation of a large dot. When the halftone data DA4 is two-value data, for example, the two-value data can be set as data in which 0 corresponds to no dot and 1 corresponds to formation of a dot. When a pixel i is focused on, pixel values (Ci, Mi, Yi, Ki) of the CMYK data DA3 are converted into pixel values (ci, mi, yi, ki).

The halftone processing unit 44 may generate the halftone data DA4 of all regions of the print image IM1 and deliver the halftone data DA4 to the signal transmission unit 45, or may generate the halftone data DA4 in units of the print region R0 or units of the raster RA and deliver the halftone data DA4 to the signal transmission unit 45.

The signal transmission unit 45 generates a driving signal SG corresponding to a voltage signal to be applied to a driving element 63 of the head 61 from the halftone data DA4 and outputs the driving signal SG to a driving circuit 62. For example, when the halftone data DA4 indicates "formation of a small dot", a driving signal for ejecting an ink droplet for the small dot is output. When the halftone data DA4 indicates "formation of a middle dot", a driving signal for ejecting an ink droplet for the middle dot is output. When the halftone data DA4 indicates "formation of a large dot", a driving signal for ejecting an ink droplet for the large dot is output. The signal transmission unit 45 outputs a sub-scanning distance signal indicating a feeding amount (the distance d of the sub-scanning) to a sheet feeding mechanism 53. In a case in which the sheet feeding mechanism 53 corrects a predetermined feeding amount to a correction amount (referred to as Δd) and feeds the print substrate ME1 in the sub-scanning direction D3, the signal transmission unit 45 may output the correction amount Δd corresponding to the distance d of the sub-scanning to the sheet feeding mechanism 53.

The units 41 to 45 may be configured of application specific integrated circuits (ASICs), data to be processed may be directly read from the RAM 20, or processed data may be directly written on the RAM 20.

The mechanism unit 50 controlled by the controller 10 includes a carriage motor 51, the sheet feeding mechanism 53, a carriage 60, the head 61, a platen 54, and a platen gap adjustment unit 55. The carriage motor 51 reciprocates the carriage 60 in the main scanning direction D2 via a plurality of gears and a belt 52 (none of which is illustrated). The sheet feeding mechanism 53 transports the print substrate ME1 in the sub-scanning direction D3. When a sub-scanning distance signal is input from the controller 10, the sheet feeding mechanism 53 transports the print substrate ME1 by the distance d indicated by the sub-scanning distance signal at the time of the sub-scanning. The head 61 that ejects the ink droplets 67 of, for example, CMYK is mounted on the carriage 60. The head 61 includes the driving circuit 62 and the driving element 63. The driving circuit 62 applies a voltage signal to the driving element 63 according to the driving signal SG input from the controller 10. As the driving element 63, for example, a piezoelectric element that applies pressure to the ink (liquid) 66 inside pressure chambers communicating with the nozzles 64 or a driving element that ejects the ink droplets 67 from the nozzles 64 by generating bubbles in pressure chambers by heat can be used. The ink 66 is supplied from ink cartridges (liquid cartridges) 65 to the pressure chambers of the head 61. A combination of the ink cartridges 65 and the head 61 is installed for each of, for example, CMYK. The ink 66 in the pressure chambers is ejected as the ink droplets 67 from the nozzles 64 to the print substrate ME1 by the driving element 63, and thus the dots DT of the ink droplets 67 are formed on the print substrate ME1 such as a print sheet. The head 61 is moved in the main scanning direction D2, that is, the plurality of nozzles 64 and the print substrate ME1 are relatively moved in the main scanning direction D2 to form dots according to the sizes of the dots indicated by the halftone data DA4 and form the print image IM1 on the print substrate ME1.

Figure 5A:
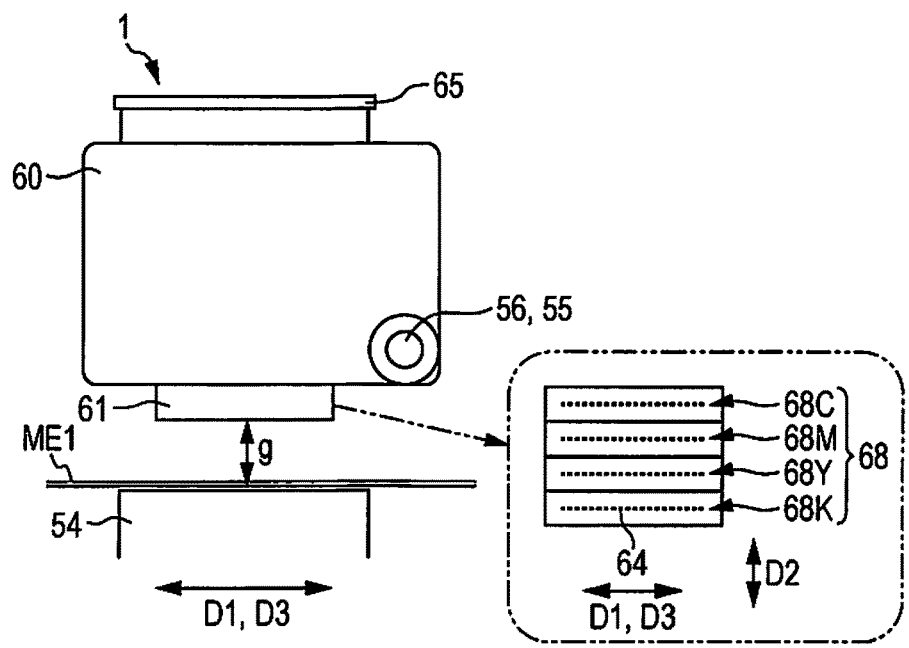
FIG. 5A is a diagram schematically illustrating the printing apparatus including a platen gap adjustment unit.
Figure 5B:
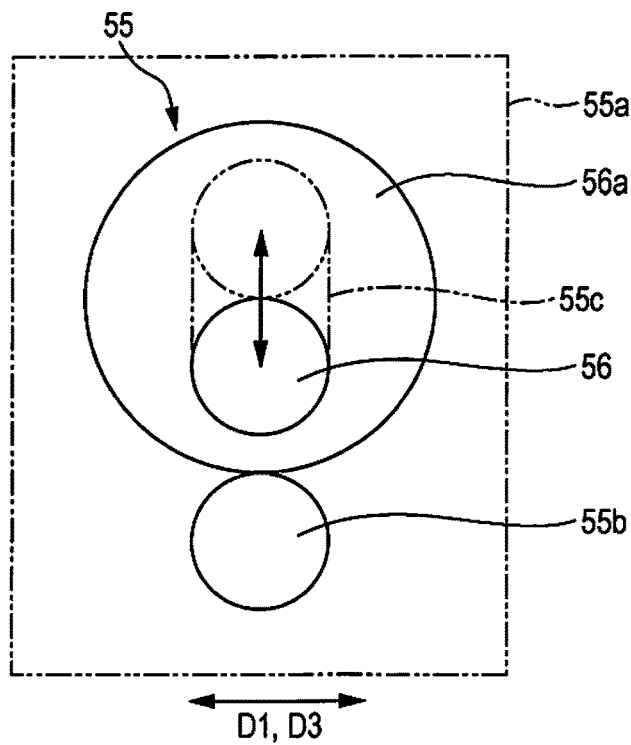
FIG. 5B is a diagram schematically illustrating an example of the platen gap adjustment unit.

FIG. 5A schematically illustrates an example of the printing apparatus including a platen gap adjustment unit. FIG. 5B schematically illustrates an example of the platen gap adjustment unit. The above-described carriage 60 is supported to be movable in the main scanning direction D2 with respect to a carriage guide shaft 56 of which a longitudinal direction is oriented in the main scanning direction D2. The platen 54 faces the head 61 and supports the rear surface of the print substrate ME1. The rear surface is an opposite surface of the print substrate ME1 to a surface on which the print image IM1 is formed and is a non-print surface at the time of single-side printing. The platen gap adjustment unit 55 illustrated in FIG. 5B includes a side frame 55*a*, a cam follower 55*b*, and a cam 56*a* and changes the gap (platen gap) between the head 61 and the platen 54 to a gap g input from the controller 10 by displacing the guide shaft 56 with respect to the fixed platen 54.

The cam follower 55*b* is fixed to the side frame 55*a* of the mechanism unit 50. The guide shaft 56 is guided to a long hole 55*c* formed in the side frame 55*a* to be movable in directions in which the guide shaft 56 is closed to and separated from the platen 54, and movement in directions other than the directions are regulated. The cam 56*a* is fitted at both ends of the guide shaft 56 and is rotatable along with the guide shaft 56 while coming into contact with the cam follower 55*b*. When the cam 56*a* is rotated by a driving source (not illustrated), the platen gap (g) is adjusted.

The RAM 20 stores a program PRG2 including a program that causes the printing apparatus 1 to function as the printing control device U0, printing mode information MD1, and print substrate type information DM1.

The nonvolatile memory 30 stores, for example, program data PRG1 loaded on the RAM 20 and a one-time feeding amount Xpg at the time of band printing. A read-only memory (ROM), a flash memory, or a magnetic recording medium such as a hard disk is used as the nonvolatile memory 30. The loading of the program data PRG1 means writing the program data PRG1 on the RAM 20 as the program PRG2 which can be interpreted by the CPU 11.

The card I/F 71 is a circuit that writes data on the memory card 90 or reads data from the memory card 90.

The communication I/F 72 is connected to the host apparatus HT1, and inputs and outputs information to and from the host apparatus HT1. The host apparatus HT1 includes a computer such as a personal computer, a digital camera, a digital video camera, and a mobile phone such as a smartphone.

The operation panel 73 includes an output unit 74 and an input unit 75 and a user can input various instructions to the printing apparatus 1. The output unit 74 is configured of, for example, a liquid crystal panel (display unit) that displays information according to various instructions or information indicating a state of the printing apparatus 1. The output unit 74 may output such information as audio. The input unit 75 is configured of, for example, an operation key (operation input unit) such as a cursor key or a decision key. The input unit 75 may be, for example, a touch panel that receives an operation on a display screen.

(3) Operation of Band Printing

First, an operation of a serial printer performing band printing will be described with reference to FIG. 4. As illustrated in FIG. 4, when L0 is the length of the nozzle line 68 in the sub-scanning direction D3 and d is a one-time feeding amount of the print substrate ME1 intermittently transported in the sub-scanning direction D3, d=L0 is satisfied when dots illustrated in FIGS. 1 and 2 are not extended. In the example of FIG. 4, when the head 61 in the pass P1 at the time of stop of the transport of the print substrate ME1 is moved in the main scanning direction D2 and forms the dots DT using the ink droplets 67, the print substrate ME1 is transported by the distance d and the head 61 at the subsequent pass P2 at the time of stop of the transport of the print substrate ME1 is moved in the main scanning direction D2 to form the dots DT by the ink droplets 67. Here, one-time scanning is referred to as "pass". In bi-directional (Bi-d) printing, movement directions of the head 61 at the time of the ejection of the ink droplets are mutually different in the passes P1 and P2. In uni-directional (Uni-d) printing, movement directions of the head 61 at the time of the ejection of the ink droplets are the same in the passes P1 and P2. The same operation is performed in a subsequent pass P3 and the like.

(4) Example of Printing Control Process of Changing Feeding Amount According to Platen Gap Next, an example of a printing control process of changing a feeding amount according to the platen gap (g) will be described with reference to FIGS. 1, 3, 6, 7, and the like.

FIG. 6 schematically illustrates an example of the structure of a platen gap (PG) table T1 used in the printing apparatus 1. In the PG table T1, the platen gap (g) and the feeding amount Xpg are associated with each printing mode such as normal single-side printing, normal double-side printing, and envelope printing. In FIG. 6, a platen gap gp1 and a feeding amount Xp1 are associated with the normal single-side printing, a platen gap gp2 and a feeding amount Xp2 are associated with the normal double-side printing, and a platen gap gp3 and a feeding amount Xp3 are associated with the envelope printing. Here, $0<gp1<gp2<gp3$ and $0<Xp1<Xp2<Xp3$ are satisfied. The platen gaps gp1, gp2, and gp3 are not particularly limited. However, within a range in which the above-described magnitudes are satisfied, for example, gp1 can be set to about 1 mm to about 2 mm, gp2 can be set to about 1.5 mm to about 2.5 mm, and gp3 can be set to about 2 mm to about 3 mm. The feeding amounts Xp1, Xp2, and Xp3 are suitable when the dark stripes BA1 illustrated in FIG. 20 are not conspicuous and thin stripes (white stripes in a case of a white print substrate) between the print regions R0 occurring separateness of the print regions R0 are not generated or are not conspicuous. For example, in a case in which a feeding amount Xpg is set with respect to a certain platen gap, the feeding amount Xpg may be set to be large when the dark stripes BA1 are conspicuous. The feeding amount Xpg may be set to be small when the thin stripes between the print regions R0 are conspicuous.

For example, the PG table T1 is stored in the nonvolatile memory 30 illustrated in FIG. 3 and is used for control of the controller 10.

As illustrated in FIG. 1, the landing range of the ink droplets in the sub-scanning direction D3 is extended from X1 to X2 due to high-speed main scanning of the head 61 when the platen gap is increased from the first gap g1 to the second gap g2. Accordingly, the controller 10 controls the one-time feeding amount of the sub-scanning to relatively short X1 in a case in which the platen gap is the relatively narrow gap g1, and controls the one-time feeding amount of the sub-scanning to relatively long X2 in a case in which the platen gap is the relatively broad gap g2. The gaps g1 and g2 according to the present technology can be relatively applied. Therefore, when the platen gap gp1 illustrated in FIG. 6 is applied to the first gap g1, the platen gaps gp2 and gp3 become the second gap g2, the feeding amount Xp1 becomes X1, and the feeding amounts Xp2 and Xp3 become X2. Further, when the platen gap gp2 illustrated in FIG. 6 is applied to the first gap g1, the platen gap gp3 becomes the second gap g2, the feeding amount Xp2 becomes X1, and the feeding amount Xp3 becomes X2.

FIG. 7 illustrates an example (part 1) of the printing control process performed by the controller 10. Here, step S140 corresponds to the sub-scanning control unit U1. Hereinafter, notation of "step" is omitted.

When an image is input from the host apparatus HT1, the memory card 90, or the like, the controller 10 performs an initial setting process including setting of the printing mode, setting of the platen gap (g), and setting of the feeding amount Xpg (S110). The process of setting the printing mode can be, for example, a process of storing the printing mode information MD1 indicating the printing mode selected and operated on the operation panel 73 in the RAM 20 or a process of storing the printing mode information MD1 input from the host apparatus HT1 to the communication I/F 72 in the RAM 20. The process of setting of the platen gap can be, for example, a process of acquiring the platen gap (g) corresponding to the printing mode indicated by the printing mode information MD1 from the PG table T1 and transmitting the platen gap (g) to the platen gap adjustment unit 55. The process of setting the feeding amount can be, for example, a process of acquiring the feeding amount Xpg corresponding to the printing mode indicated by the printing mode information MD1 from the PG table T1 and transmitting a sub-scanning distance signal indicating d=Xpg to the sheet feeding mechanism 53.

After the initial setting process, the resolution conversion unit 41 of the controller 10 converts the resolution of the input image into a set resolution to generate the RGB data DA2 before color conversion (S120). The color conversion unit 42 of the controller 10 performs color conversion to convert the RGB data DA2 into the CMYK data DA3 with reference to a predetermined color conversion table (S130). In a case in which the CMYK data DA3 is divided into pieces of dot data of small, middle, and large dots, the dot distribution unit 43 of the controller 10 generates dot data from the CMYK data DA3 with reference to a dot distribution table.

The halftone processing unit 44 of the controller 10 generates the dot data necessary for the halftone data DA4 corresponding to one-time scanning (corresponding to one band) or generates the halftone data DA4 corresponding to one-time scanning based on the CMYK data DA3, and delivers the dot data or the halftone data DA4 to the signal transmission unit 45 (S140). For example, in a case in which the halftone data DA4 for forming the print image IM1 of the print region R1 is generated from the current time, the partial halftone data DA4 may be generated from the dot data or the CMYK data DA3 corresponding to the print region R1. The same also applies to the print regions R2, R3, etc.

The signal transmission unit 45 of the controller 10 generates the driving signal SG from the halftone data DA4, outputs the driving signal SG to the driving circuit 62 of the head 61, generates the sub-scanning distance signal indicating the distance d=Xpg of the sub-scanning, and outputs the sub-scanning distance signal to the sheet feeding mechanism 53 (S150). Accordingly, the multivalue or two-value dots DT according to the halftone data DA4 are formed as the print image IM1 corresponding to one band in the print region R0 and the print substrate ME1 is transported by the distance Xpg in the sub-scanning direction D3. Of course, the print image IM1 is formed in the print region R1 from the halftone data DA4 corresponding to the print region R1 and the print image IM1 is formed in the print region R2 from the halftone data DA4 corresponding to the print region R2. The same also applies to the print regions subsequent to the print region R3.

The controller 10 determines whether the processes of S140 to S150 are performed on all of the CMYK data DA3 (S160). In a case in which the unprocessed CMYK data DA3 remains, the processes of S140 to S150 of each band are repeated. In a case in which the processes of S140 to S150 are performed on all of the CMYK data DA3, the controller 10 ends the printing control process.

For example, at the time of the normal single-side printing, the platen gap is adjusted to gp1 (corresponding to a first gap) by the platen gap adjustment unit 55 and the print substrate ME1 is transported by the feeding amount (the distance of the sub-scanning) Xp1 at the time of the sub-scanning by the sheet feeding mechanism 53. At the time of the normal double-side printing, the platen gap is adjusted to gp2 (where gp2>gp1) corresponding to the second gap by the platen gap adjustment unit 55 and the print substrate ME1 is transported by the feeding amount Xp2 (where Xp2>Xp1) at the time of the sub-scanning by the sheet feeding mechanism 53. When the one-time feeding amount is fixed to Xp1, the landing range of the ink droplets in the sub-scanning direction D3 at the time of the normal single-side printing is extended, and thus the dark stripes BA1 illustrated in FIG. 20 may occur. By increasing the one-time feeding amount to Xp2, the dark stripes BA1 are suppressed.

At the time of the envelope printing, the platen gap is adjusted to gp3 (corresponding to the second gap) broader than gp2 (corresponding to the first gap) by the platen gap adjustment unit 55 and the print substrate ME1 is transported by the feeding amount Xp3 (where Xp3>Xp2) at the time of the sub-scanning by the sheet feeding mechanism 53. Accordingly, even when the platen gap is further increased up to gp3, the dark stripes BA1 are suppressed by further increasing the one-time feeding amount up to Xp3.

As described above, the distance X2 in the case in which the platen gap is the second gap g2 (where g2>g1) is longer than the distance X1 of the sub-scanning in the case in which the platen gap is the first gap g1 when the sub-scanning is the sub-scanning of the same printing scheme and is the sub-scanning of the distance d longer than the nozzle pitch Np in the sub-scanning direction D3 is performed. Accordingly, in the present specific example, it is possible to suppress the banding occurring according to the platen gap.

(5) Example of Printing Control Process of Changing Feeding Amount According to Record Density of Print Region Next, an example of a printing control process of changing the feeding amount according to the record density RD of the print image IM1 of the print region R0 will be described with reference to FIGS. 2, 3, 8, 9, and the like. In this example, the feeding amount Xpg stored in the non-volatile memory 30 is set to a constant value Xp0 (the distance of the sub-scanning). In the PG table T1 illustrated in FIG. 6, the feeding amount is not associated with the printing mode and the platen gap (g) is associated with the printing mode.

Figure 8:
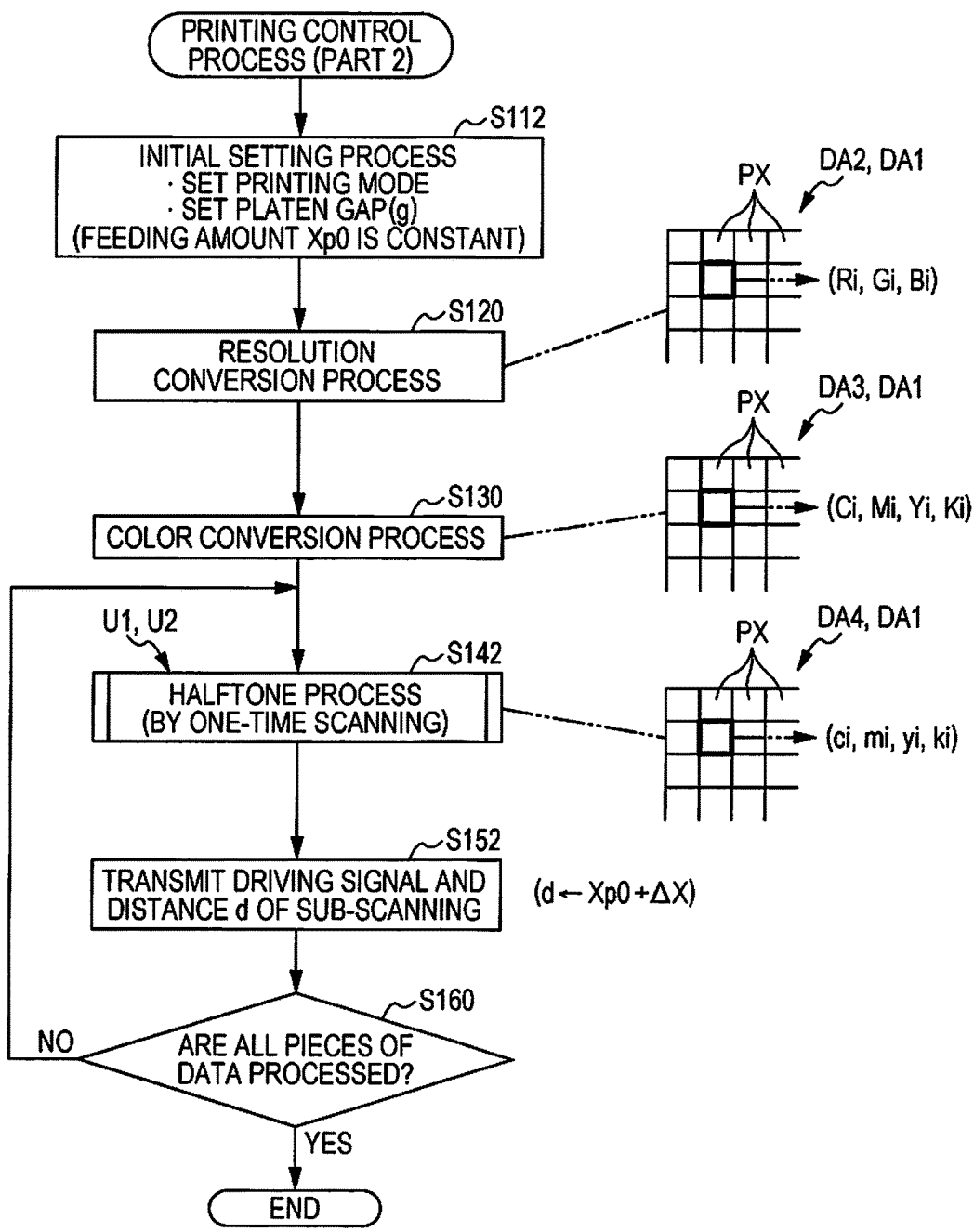
FIG. 8 is a flowchart illustrating another example of a printing control process.

FIG. 8 illustrates an example (part 2) of the printing control process performed by the controller 10. In this process, S110, S140, and S150 of the printing control process illustrated in FIG. 7 are substituted with S112, S142, and S152. The detailed description of the processed denoted by the same reference numerals will be omitted. The same also applies below. Here, step S142 corresponds to the sub-scanning control unit U1 and the record density acquisition unit U2.

When an image is input from the host apparatus HT1 or the like, the controller 10 performs an initial setting process including setting of the printing mode and setting of the platen gap (g) (S112). After the resolution conversion process (S120) and the color conversion process (S130), the halftone processing unit 44 of the controller 10 performs the halftone process of generating the halftone data DA4 corresponding to one-time scanning (S142).

Figure 9:
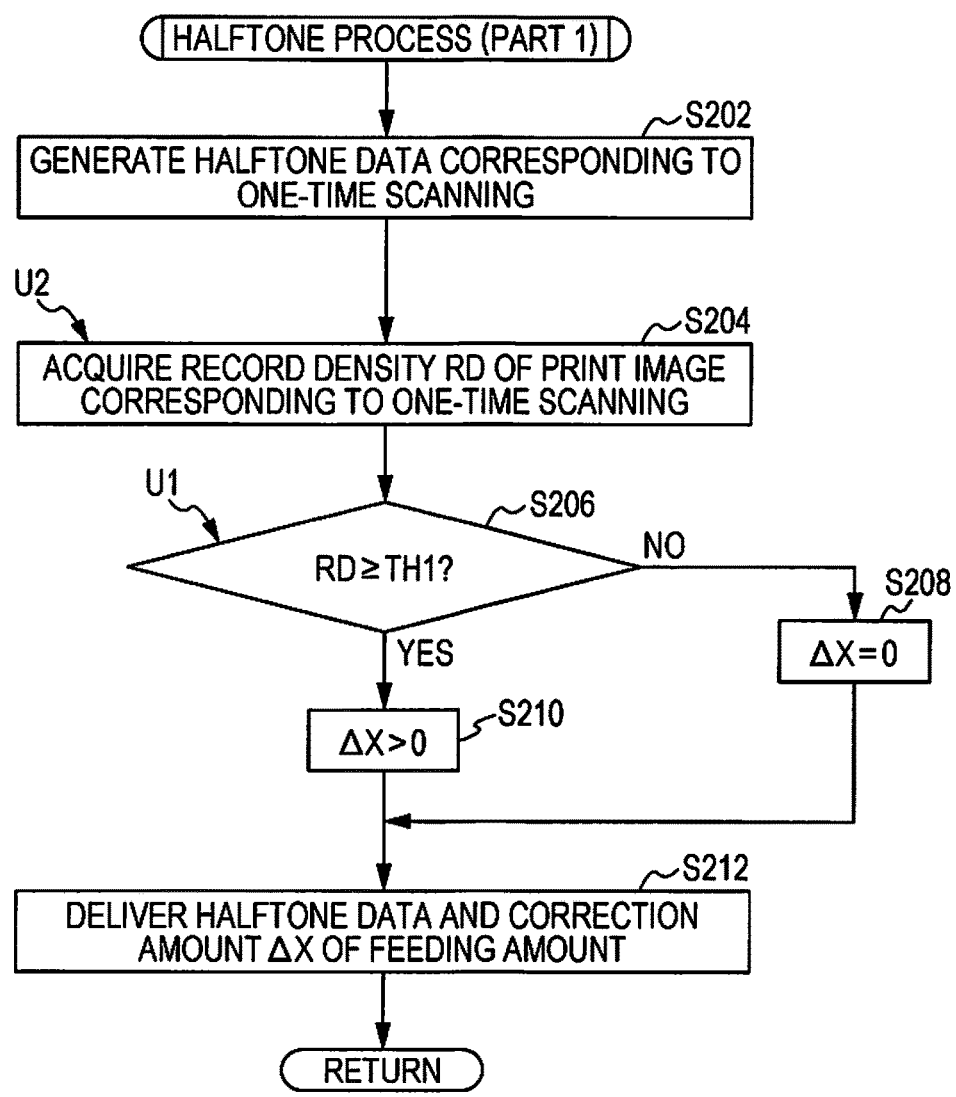
FIG. 9 is a flowchart illustrating an example of a halftone process.

FIG. 9 illustrates an example (part 1) of the halftone process performed in S142. This process is performed by the halftone processing unit 44 of the controller 10. Here, S204 corresponds to the record density acquisition unit U2 and S206 to S212 correspond to the sub-scanning control unit U1.

The halftone processing unit 44 first generates the dot data necessary for the halftone data DA4 corresponding to one-time scanning (specific print region) or generates the halftone data DA4 corresponding to one-time scanning based on the CMYK data DA3 (S202). For example, in a case in which the halftone data DA4 for forming the print image IM1 of the print region R1 is generated, the print region R1 becomes a specific print region. In a case in which the halftone data DA4 for forming the print image IM1 of the print region R2 is generated, the print region R2 becomes the specific print region. The same also applies to the print regions subsequent to the print region R3.

In S204, the record density RD of the print image IM1 of the specific print region (R0) is acquired based on the halftone data DA4 (the print data DA1) corresponding to one-time scanning. The record density RD can be expressed as, for example, (Ndot/Npx)×100% when Npx is the number of all the pixels of the specific print region R0 and Ndot is the total number of dots (large-dot conversion) formed in the specific print region R0. Here, a middle dot is converted into Cm (0<Cm<1) of a large dot and a small dot is converted into Cs (0<Cs<Cm) of a large dot.

In S206, it is determined whether the record density RD is equal to or greater than predetermined determination density TH1, that is, the record density RD is a higher-density side from a determination standard. The determination density TH1 is greater than 0% and equal to or less than 100%. When TH1' is assumed to be determination density considerably less than the determination density, the fact that "the determination density TH1' is greater" includes the fact that "the record density is equal to or greater than the determination density". For example, in a case in which the nozzle pitch Np is 600 npi (corresponding to the print resolution 600 dpi), the determination density TH1 can be set to about 40% to about 60% although the invention is not particularly limited. Further, in a case in which the nozzle pitch Np is 300 npi (corresponding to the print resolution 300 dpi), the determination density TH1 can be set to about 80% to about 100% although the invention is not particularly limited. When the nozzle pitch Np is fine (the print resolution is high), the landing range of the ink droplets is easily extended in the sub-scanning direction D3. When the nozzle pitch Np is rough (the print resolution is low), the landing range of the ink droplets tends to be slightly extended in the sub-scanning direction D3.

In a case in which RD<TH1 is satisfied and the record density RD is a lower-density side from the determination standard in S206, the halftone processing unit 44 sets the correction value ΔX with respect to the standard feeding amount Xp0 to 0 (S208), and then the process proceeds to S212. Conversely, in a case in which RD≥TH1 is satisfied and the record density RD is a higher-density side from the determination standard in S206, the halftone processing unit 44 sets the correction value ΔX with respect to the standard feeding amount Xp0 to a positive value (S210), and then the process proceeds to S212.

Thereafter, the halftone processing unit 44 delivers the halftone data DA4 and the correction value ΔX of the feeding amount to the signal transmission unit 45 (S212), and then the halftone process ends.

The signal transmission unit 45 receiving the halftone data DA4 and the correction value ΔX of the feeding amount from the halftone processing unit 44 generates the driving signal SG from the halftone data DA4, outputs the driving signal SG to the driving circuit 62, generates a sub-scanning distance signal indicating a sub-scanning distance d=Xp0+ΔX obtained by correcting the standard feeding amount Xp0 with the correction value ΔX, and outputs the sub-scanning distance signal to the sheet feeding mechanism 53 in S152 of FIG. 8. Accordingly, the multivalue or two-value dots DT according to the halftone data DA4 are formed as the print image IM1 corresponding to one band in the print region R0, and the print substrate ME1 is transported by a distance Xp0+ΔX in the sub-scanning direction D3. The processes of S142 to S152 are repeated until the processes are performed on all of the CMYK data DA3 (S160).

Here, as illustrated in FIG. 2, the record density RD of the lower-density side from the determination standard is set to the first record density RD1 (RD1<TH1) and the record density RD of the higher-density side from the determination standard is set to the second record density RD2 (RD2≥TH1). That is, 0%≤RD1<TH1≤RD2≤100% is satisfied. In a case in which the record density RD acquired in S204 is the relatively low first record density RD1, ΔX=0 is satisfied, and therefore the print substrate ME1 is transported by the standard distance Xp0 at the time of the sub-scanning by the sheet feeding mechanism 53. The feeding amount Xp0 corresponds to the feeding amount X3 in FIG. 2. Conversely, in a case in which the record density RD acquired in S204 is the relatively high second record density RD2, ΔX>0 is satisfied, and therefore the print substrate ME1 is transported by the distance Xp0+ΔX at the time of the sub-scanning by the sheet feeding mechanism 53. The feeding amount Xp0+ΔX corresponds to the feeding amount X4 (X4>X3) in FIG. 2. When a one-time feeding amount is fixed to XP0 and the record density RD of the print image IM1 of the print region R0 is the higher-density side from the determination standard, the landing range of the ink droplets is extended in the sub-scanning direction D3 due to the high-speed main scanning of the head 61, and thus the dark stripes BA1 illustrated in FIG. 21 may occur. By increasing the one-time feeding amount Xp0+ΔX, the dark stripes BA1 are suppressed.

Figure 10:
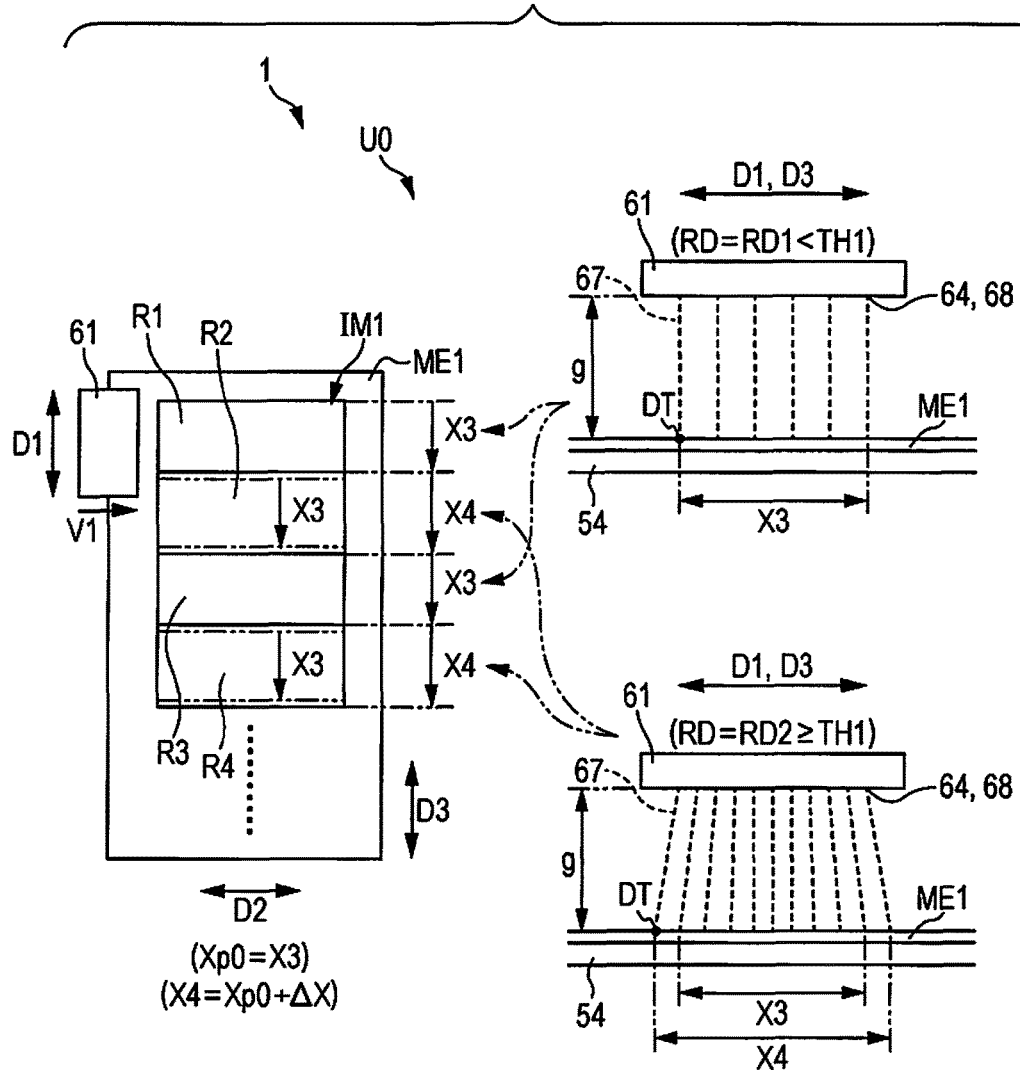
FIG. 10 is a diagram schematically illustrating an example in which a feeding amount is changed according to record density.

The record density RD is changed according to the position of the print image IM1 in some cases. Accordingly, as illustrated in FIG. 10, the feeding amount is change during printing in some cases. In the print image IM1 illustrated in FIG. 10, the first record density RD1 of the print regions R1 and R3 is lower than the determination density TH1 and the second record density RD2 of the print regions R2 and R4 is equal to or higher than the determination density TH1. In this case, when the print image IM1 in the print region R1 with the relatively low record density RD is formed, the sub-scanning of the feeding amount X3=Xp0 is performed. When the print image IM1 in the print region R2 with the relatively high record density RD is formed, the sub-scanning of the feeding amount X4=Xp0+ ΔX is performed. The same also applies the sub-scanning when the print image IM1 in the print regions R3, R4, etc. is formed. Of course, the value of the record density (RD1) of the print region R1 may be different from the value of the record density (RD1) of the print region R3, or the value of the record density (RD2) of the print region R2 may be different from the value of the record density (RD2) of the print region R4.

As illustrated in FIG. 10, the sub-scanning distance X3 is relatively short at the time of forming the print image IM1 in the print regions R1 and R3 in which the landing range of the ink droplets in the sub-scanning direction D3 is relatively narrow. The sub-scanning distance X4 is relatively long at the time of forming the print image IM1 in the print regions R2 and R4 in which the landing range of the ink droplets in the sub-scanning direction D3 is extended. Accordingly, the dark stripes BA1 illustrated in FIG. 21 are appropriately suppressed.

As described above, the sub-scanning distance X4 in the case in which the record density RD is the second record density RD2 is longer than the sub-scanning distance X3 in the case in which the record density RD is the first record density RD1 when the sub-scanning which is the sub-scanning of the same printing scheme and is the sub-scanning of the distance d longer than the nozzle pitch Np in the sub-scanning direction D3 is performed. Accordingly, in the specific example, it is possible to suppress the banding occurring according to the record density.

The record density RD of the print region R0 may be acquired from the halftone data DA4 and can also be acquired from print data such as the CMYK data DA3 or the RGB data DA2.

(6) Example of Printing Control Process of Changing Feeding Amount According to Platen Gap and Record Density In a case in which the platen gap (g) is broad and the record density RD of the print region R0 is low, the dark stripes are rarely conspicuous even when the feeding amount at the time of the sub-scanning is not increased, compared to the case in which the platen gap (g) is narrow. Conversely, in a case in which the record density RD of the print region R0 is high, the dark stripes are conspicuous when the same feeding amount as the feeding amount in the case in which the platen gap (g) is narrow is set, in a case in which the platen gap (g) is broad. Accordingly, when the feeding amount is changed according to the platen gap (g) and the record density RD, there is a possibility of the banding being further suppressed.

Figure 11:
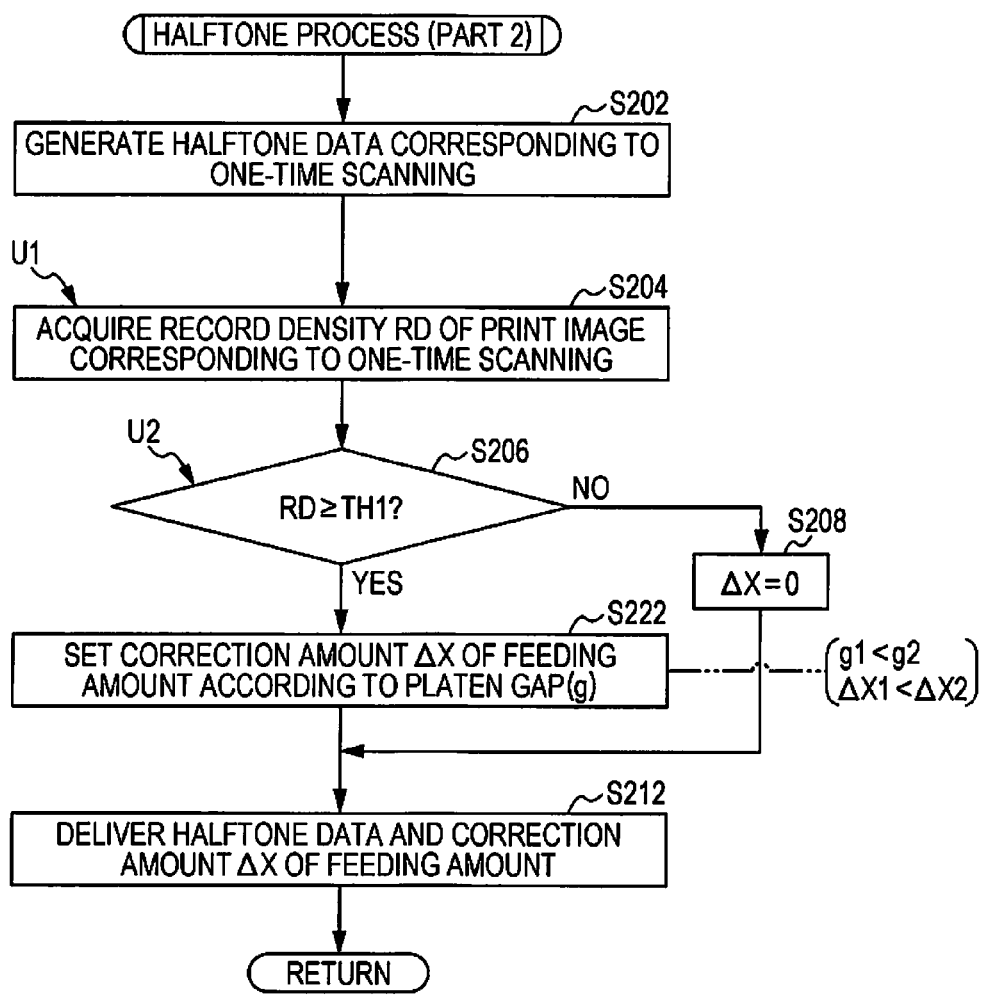
FIG. 11 is a flowchart illustrating another example of a halftone process.

FIG. 11 illustrates an example (part 2) of the halftone process performed in S142 of FIG. 8. In this process, S210 of the halftone process illustrated in FIG. 9 is substituted with S222.

When the halftone data DA4 corresponding to one-time scanning (specific print region) is generated (S202) and the record density RD of the print image IM1 of the specific print region (R0) is acquired (S204), the halftone processing unit 44 determines whether the record density RD is equal to or greater than the determination density TH1 (S206). In a case in which RD<TH1 is satisfied in S206, the halftone processing unit 44 sets the correction value ΔX with respect to the standard feeding amount XP0 to 0 (S208), and then the process proceeds to S212. Conversely, when RD≥TH1 is satisfied in S206, the halftone processing unit 44 sets the correction value ΔX (where ΔX>0) with respect to the standard feeding amount Xp0 according to the platen gap (g) (S222), and the process proceeds to S212.

The set correction value ΔX can be set as a correction value corresponding to the feeding amount Xp1, Xp2, or Xp3 of the PG table T1 illustrated in FIG. 6. For example, when the standard feeding amount is Xp0 (where 0<Xp0<Xp1), a correction value at the time of the normal single-side printing can be set to ΔX=Xp1−Xp0, a correction value at the time of the normal double-side printing can be set to ΔX=Xp2−Xp0, and a correction value at the time of the envelope printing can be set to ΔX=Xp3−Xp0.

Here, when a correction value in a case in which the platen gap is the first gap g1 is set to ΔX1 and a correction value in a case in which the platen gap is the second gap g2 (where g2>g1) is set to ΔX2, 0<ΔX1<ΔX2 is satisfied. For example, when the platen gap gp1 is applied to the first gap g1, a correction value corresponding to the platen gaps gp2 and gp3 is ΔX2. Further, when the platen gap gp2 is applied to the first gap g1, a correction value corresponding to the platen gap gp3 is ΔX2.

Thereafter, the halftone processing unit 44 delivers the halftone data DA4 and the correction value ΔX of the feeding amount to the signal transmission unit 45 (S212), and then the halftone process ends. In S152 of FIG. 8, the signal transmission unit 45 generates the driving signal SG from the halftone data DA4, outputs the driving signal SG to the driving circuit 62, generates the sub-scanning distance signal indicating the sub-scanning distance d=Xp0+ΔX obtained by correcting the standard feeding amount Xp0 with the correction value ΔX, and outputs the sub-scanning signal to the sheet feeding mechanism 53. Accordingly, the multivalue or two-value dots DT according to the halftone data DA4 are formed as the print image IM1 corresponding to one band in the print region R0, and the print substrate ME1 is transported by a distance Xp0+ΔX in the sub-scanning direction D3. The processes of S142 to S152 are repeated until the processes are performed on all of the CMYK data DA3 (S160 of FIG. 8).

As described above, in the case in which the record density RD of the specific print region (R0) is the relatively low first record density RD1, ΔX=0 is satisfied, and therefore the print substrate ME1 is transported by the standard distance Xp0 at the time of the sub-scanning by the sheet feeding mechanism 53. The feeding amount Xp0 corresponds to the feeding amount X3 in FIG. 2. Conversely, in the case in which the record density RD of the specific print region (R0) is the relatively high second record density RD2, ΔX>0 is satisfied, and therefore the print substrate ME1 is transported by the distance Xp0+ΔX at the time of the sub-scanning by the sheet feeding mechanism 53. Here, the correction value ΔX2 in the case in which the platen gap is the second gap g2 (where g2>G1) is greater than the correction value ΔX1 in the case in which the platen gap is the first gap g1. Therefore, as illustrated in FIG. 1, the sub-scanning distance X2 in the case in which the platen gap is the second gap g2 (where g2>g1) is longer than the sub-scanning distance X1 in the case in which the platen gap is the first gap g1. Accordingly, in the specific example, it is possible to appropriately suppress the banding occurring according to the platen gap and the record density.

(7) Example of Printing Control Process of Changing Feeding Amount According to Type of Print Substrate Even when the platen gap or the record density is the same, the extension of the landing range of the ink droplets in the sub-scanning direction D3 due to the high-speed main scanning of the head 61 is different according to easiness of ink permeation into the print substrate in some cases.

FIG. 12 schematically illustrates a range in which the dots DT are formed with the ink droplets 67 ejected from the head 61 to the print substrate ME1 at the time of the band printing. On the left side of FIG. 12, in a case in which the print substrate ME1 is the first print substrate ME11, such as a glossy sheet, in which permeation is relatively difficult, the ink droplets 67 ejected from the nozzle line 68 and a form of the sub-scanning are illustrated. On the right side of FIG. 12, in a case in which the print substrate ME1 is the second print substrate ME12, such as a normal sheet, in which permeation is relatively easy, the ink droplets 67 ejected from the nozzle line 68 and a form of the sub-scanning are illustrated.

A landing range X6 of the ink droplets on the second print substrate ME12 in which permeation is relatively easy is extended in the sub-scanning direction D3 more than a landing range X5 of the ink droplets on the first print substrate ME11 in which permeation is relatively difficult. Accordingly, when the sub-scanning of the distance d longer than the nozzle pitch Np is performed, a distance of the sub-scanning in the case in which the print substrate ME1 is the second print substrate ME12 is set to be longer than a distance of the sub-scanning in the case in which the print substrate ME1 is the first print substrate ME11.

FIG. 13 illustrates an example (part 3) of the printing control process performed by the controller 10. First, an example in which the feeding amount is changed according to the type of print substrate ME1 along with the platen gap (g) will be described. Here, S302 corresponds to the print substrate type acquisition unit U3, and S140 and S306 correspond to the sub-scanning control unit U1.

When an image is input from the host apparatus HT1 or the like, the controller 10 acquires the print substrate type information DM1 indicating the type of print substrate ME1 supported by the platen 54 (S302). The process of S302 can be, for example, a process of storing the print substrate type information DM1 indicating the type of print substrate selected and operated on the operation panel 73 in the RAM 20 or a process of storing the print substrate type information DM1 input from the host apparatus HT1 to the communication I/F 72 in the RAM 20.

Thereafter, the controller 10 performs the initial setting process (S110), the resolution conversion process (S120), and the color conversion process (S130) illustrated in FIG. 7 (S304). In the initial setting process, the platen gap (g), the feeding amount Xpg, and the like are set. After the color conversion process, the halftone processing unit 44 of the controller 10 performs the halftone process of generating the halftone data DA4 corresponding to one-time scanning (S140). The controller 10 acquires a correction value $\Delta Y$ of the feeding amount according to the type of print substrate ME1 (S306). For example, in a case in which the type of print substrate ME1 is the first print substrate ME11, such as a glossy sheet, in which permeation is difficult, the correction value $\Delta Y$ with respect to the feeding amount Xpg is set to 0. Further, in a case in which the type of print substrate ME1 is the second print substrate ME12, such as a normal sheet, in which permeation is easy, the correction value $\Delta Y$ with respect to the feeding amount Xpg is set to a positive value.

The signal transmission unit 45 receiving the halftone data DA4, the feeding amount Xpg, and the correction value $\Delta Y$ generates the driving signal SG from the halftone data DA4, outputs the driving signal SG to the driving circuit 62, generates a sub-scanning distance signal indicating the sub-scanning distance $d=Xpg+\Delta Y$ obtained by correcting the feeding amount Xpg with the correction value $\Delta Y$, and outputs the sub-scanning distance signal to the sheet feeding mechanism 53 (S152). Accordingly, the multivalue or two-value dots DT according to the halftone data DA4 are formed as the print image IM1 corresponding to one band in the print region R0 and the print substrate ME1 is transported by the distance $Xpg+\Delta Y$ in the sub-scanning direction D3.

In a case in which the type of print substrate ME1 is the first print substrate ME11 in which permeation is difficult, $\Delta Y=0$ is satisfied, and therefore the print substrate ME11 is transported by the standard distance Xpg at the time of the sub-scanning by the sheet feeding mechanism 53. The feeding amount Xpg corresponds to the feeding amount X5 in FIG. 12. Conversely, in a case in which the type of print substrate ME1 is the second print substrate ME12 in which permeation is easy, $\Delta Y>0$ is satisfied, and therefore the print substrate ME1 is transported by the distance $Xpg+\Delta Y$ at the time of the sub-scanning by the sheet feeding mechanism 53. The feeding amount $Xpg+\Delta Y$ corresponds to a feeding amount X6 (where X6>X5) in FIG. 12. When a one-time feeding amount is not corrected from Xpg, the landing range of the ink droplets is extended in the sub-scanning direction D3 due to the high-speed main scanning of the head 61 in the case in which the type of the print substrate ME1 is the second print substrate ME12 in which permeation is easy, and thus there is a possibility of the dark stripes occurring. By increasing the one-time feeding amount to $Xpg+\Delta Y$, the dark stripes are suppressed. Accordingly, in the present specific example, it is possible to suppress the banding occurring according to the type of print substrate along with the platen gap.

The feeding amount can also be changed according to the type of print substrate ME1 along with the record density RD. In this case, the processes of S112, S120, and S130 illustrated in FIG. 8 are performed in S304 and the process of S142 illustrated in FIG. 8 is performed instead of S140. In S152, the signal transmission unit 45 may generate a sub-scanning distance signal indicating the sub-scanning distance $d=Xp0+\Delta X+\Delta Y$ obtained by correcting the standard feeding amount Xp0 with the correction values $\Delta X$ and $\Delta Y$ and output the sub-scanning distance signal to the sheet feeding mechanism 53. In this case, S142 and S306 correspond to the sub-scanning control unit U1 and the record density acquisition unit U2.

Further, the feeding amount can also be changed according to the type of print substrate ME1 along with the platen gap (g) and the record density RD. In this case, the halftone process illustrated in FIG. 11 may be performed in S142.

Additionally, the feeding amount may be changed according to only the type of print substrate ME1 irrespective of the platen gap (g) and the record density RD. In this case, it is possible to suppress the banding occurring according to the type of print substrate.

(8) Example of Printing Control Process of Changing Feeding Amount According to Color of Print Image Even when the platen gap or the record density is the same, the extension of the landing range of the ink droplets in the sub-scanning direction D3 due to the high-speed main scanning of the head 61 is different according to the color of the print image IM1 in some cases.

FIG. 14 schematically illustrates a range in which the dots DT are formed with the ink droplets 67 ejected from the head 61 to the print substrate ME1 at the time of the band printing. On the left side of FIG. 14, in a case in which the color print image IM11 is formed, the ink droplets 67 ejected from the nozzle line 68 and a form of the sub-scanning are illustrated. On the right side of FIG. 14, in a case in which the monochromic print image IM12 is formed, the ink droplets 67 ejected from the nozzle line 68 and a form of the sub-scanning are illustrated. The monochrome printing of the print image IM12 may be printing in which only K ink is used without using chromatic ink of CMY or may be printing in which K ink is mainly used and chromatic ink of CMY is slightly mixed to form a monochromic print image of a sepia tone, a warm tone, or a cool tone.

At the time of color printing, nozzle lines 68C, 68M, 68Y, and 68K of CMYK are used to eject the ink droplets 67. On the other hand, at the time of monochrome printing, the K nozzle line 68K is mainly used to eject the ink droplets 67. Accordingly, the record density of the K dots formed by the K nozzle line 68K at the time of the monochrome printing is higher than the record density of the K dots formed by the K nozzle line 68K at the time of the color printing. Normally, the record density of the K dots formed by the K nozzle line 68K at the time of the monochrome printing is higher than the record density of the C dots formed by the C nozzle line 68C at the time of the color printing, the record density of the M dots formed by the M nozzle line 68M at the time of the color printing, and the record density of the Y dots formed by the Y nozzle line 68Y at the time of the color printing. When the record density of the K dots formed by the K nozzle line 68K at the time of the monochrome printing is high, a landing range X8 of the ink droplets in the case in which the monochromic print image IM12 is formed is extended in the sub-scanning direction D3 more than a landing range X7 of the ink droplets in the case in the color print image IM11 is formed. Accordingly, when the sub-scanning of the distance d longer than the nozzle pitch Np is performed, the distance of the sub-scanning in the case in which the monochromic print image IM12 is formed is set to be longer than the distance of the sub-scanning in the case in which the color print image IM11 is formed.

FIG. 15 illustrates an example (part 4) of the printing control process performed by the controller 10. First, an example in which the feeding amount is changed according to the color of the print image IM1 along with the platen gap (g) will be described.

When an image is input from the host apparatus HT1 or the like, the controller 10 performs the initial setting process (S110), the resolution conversion process (S120), and the color conversion process (S130) illustrated in FIG. 7 (S402). In the initial setting process, the printing mode, the platen gap (g), the feeding amount Xpg, and the like are set. The printing mode information MD1 is assumed to include print image color information indicating the color printing or the monochrome printing. After the color conversion process, the halftone processing unit 44 of the controller 10 performs the halftone process of generating the halftone data DA4 corresponding to one-time scanning (S140). The controller 10 acquires a correction value $\Delta Z$ of the feeding amount according to whether the color print image IM11 is formed or the monochromic print image IM12 is formed (S404). For example, in a case in which print color indicated by the print image color information is color, the correction value $\Delta Z$ with respect to the feeding amount Xpg is set to 0. Further, in a case in which print color indicated by the print image color information is monochromic, the correction value $\Delta Y$ with respect to the feeding amount Xpg is set to a positive value.

The signal transmission unit 45 receiving the halftone data DA4, the feeding amount Xpg, and the correction value $\Delta Z$ generates the driving signal SG from the halftone data DA4, outputs the driving signal SG to the driving circuit 62, generates a sub-scanning distance signal indicating the sub-scanning distance $d = Xpg + \Delta Z$ obtained by correcting the feeding amount Xpg with the correction value $\Delta Z$, and outputs the sub-scanning distance signal to the sheet feeding mechanism 53 (S152). Accordingly, the multivalue or two-value dots DT according to the halftone data DA4 are formed as the print image IM1 corresponding to one band in the print region R0 and the print substrate ME1 is transported by the distance $Xpg + \Delta Z$ in the sub-scanning direction D3.

In a case in which the color print image IM11 is formed, $\Delta Z = 0$ is satisfied, and therefore the print substrate ME1 is transported by the standard distance Xpg at the time of the sub-scanning by the sheet feeding mechanism 53. The feeding amount Xpg corresponds to a feeding amount X7 in FIG. 14. Conversely, in a case in which the monochromic print image IM12 is formed, $\Delta Z > 0$ is satisfied, and therefore the print substrate ME1 is transported by the distance $Xpg + \Delta Z$ at the time of the sub-scanning by the sheet feeding mechanism 53. The feeding amount $Xpg + \Delta Z$ corresponds to a feeding amount X8 (where X8>X7) in FIG. 14. When a one-time feeding amount is not corrected from Xpg, the landing range of the ink droplets is extended in the sub-scanning direction D3 due to the high-speed main scanning of the head 61 in the case in which the monochromic print image IM12 is formed, and thus there is a possibility of the dark stripes occurring. By increasing the one-time feeding amount to $Xpg + \Delta Z$, the dark stripes are suppressed. Accordingly, in the present specific example, it is possible to suppress the banding occurring according to the color of print image along with the platen gap.

The feeding amount can also be changed according to the color of the print image IM1 along with the record density RD. In this case, the processes of S112, S120, and S130 illustrated in FIG. 8 are performed in S402 and the process of S142 illustrated in FIG. 8 is performed instead of S140. In S152, the signal transmission unit 45 may generate a sub-scanning distance signal indicating the sub-scanning distance $d = Xp0 + \Delta X + \Delta Z$ obtained by correcting the standard feeding amount Xp0 with the correction values $\Delta X$ and $\Delta Z$ and output the sub-scanning distance signal to the sheet feeding mechanism 53.

Further, the feeding amount can also be changed according to the color of the print image IM1 along with the platen gap (g) and the record density RD. In this case, the halftone process illustrated in FIG. 11 may be performed in S142.

Additionally, the feeding amount may be changed according to only the color of the print image IM1 irrespective of the platen gap (g) and the record density RD. In this case, it is possible to suppress the banding occurring according to the color of the print image.

(9) Example of Printing Control Process of Changing Feeding Amount According to Print Resolution Even when the platen gap or the record density is the same, the extension of the landing range of the ink droplets in the sub-scanning direction D3 due to the high-speed main scanning of the head 61 is different according to a print resolution in some cases.

FIG. 16 schematically illustrates a range in which the dots DT are formed with the ink droplets 67 ejected from the head 61 to the print substrate ME1 at the time of the band printing. On the left side of FIG. 16, in a case in which the print resolution in the sub-scanning direction D3 is a relatively low first resolution (for example, 300 dpi), the ink droplets 67 ejected from the nozzle line 68 and a form of the sub-scanning are illustrated. On the right side of FIG. 16, in a case in which the print resolution in the sub-scanning direction D3 is a relatively high second resolution (for example, 600 dpi), the ink droplets 67 ejected from the nozzle line 68 and a form of the sub-scanning are illustrated.

At the time of a high resolution at which the print resolution in the sub-scanning direction D3 is the relatively high second resolution, more nozzles 64 are used to eject the ink droplets 67 than at the time of a low resolution at which the print resolution in the sub-scanning direction D3 is the relatively low first resolution. Accordingly, the record density of the dots formed by the nozzle line 68 at the time of the high resolution is higher than the record density of the dots formed by the nozzle line 68 at the time of the low resolution. Accordingly, a landing range X10 of the ink droplets at the time of the high resolution is extended in the sub-scanning direction D3 more than the landing range X9 of the ink droplets at the time of the low resolution. Accordingly, when the sub-scanning of the distance d longer than the nozzle pitch Np is performed, the distance of the sub-scanning at the time of the high resolution is set to be longer than the distance of the sub-scanning at the time of the low resolution.

FIG. 17 illustrates an example (part 5) of the printing control process performed by the controller 10. First, an example in which the feeding amount is changed according to the print resolution along with the platen gap (g) will be described.

When an image is input from the host apparatus HT1 or the like, the controller 10 performs the initial setting process (S110), the resolution conversion process (S120), and the color conversion process (S130) illustrated in FIG. 7 (S502). After the color conversion process, the halftone processing unit 44 of the controller 10 performs the halftone process of generating the halftone data DA4 corresponding to one-time scanning (S140). The controller 10 acquires a correction value $\Delta R$ of the feeding amount according to the print resolution in the sub-scanning direction D3 (S504). For example, in a case in which the set print resolution is the relatively low first resolution, the correction value $\Delta R$ with respect to the feeding amount Xpg is set to 0. Further, in a case in which the set print resolution is the relatively high second resolution, the correction value $\Delta R$ with respect to the feeding amount Xpg is set to a positive value.

The signal transmission unit 45 receiving the halftone data DA4, the feeding amount Xpg, and the correction value $\Delta R$ generates the driving signal SG from the halftone data DA4, outputs the driving signal SG to the driving circuit 62, generates a sub-scanning distance signal indicating the sub-scanning distance $d=Xpg+\Delta R$ obtained by correcting the feeding amount Xpg with the correction value $\Delta R$, and outputs the sub-scanning distance signal to the sheet feeding mechanism 53 (S152). Accordingly, the multivalue or two-value dots DT according to the halftone data DA4 are formed as the print image IM1 corresponding to one band in the print region R0 and the print substrate ME1 is transported by the distance $Xpg+\Delta R$ in the sub-scanning direction D3.

Since $\Delta R=0$ is satisfied at the time of the low resolution, the print substrate ME1 is transported by the standard distance Xpg at the time of the sub-scanning by the sheet feeding mechanism 53. The feeding amount Xpg corresponds to a feeding amount X9 in FIG. 16. Conversely, Since $\Delta R>0$ is satisfied at the time of the high resolution, the print substrate ME1 is transported by the distance $Xpg+\Delta R$ at the time of the sub-scanning by the sheet feeding mechanism 53. The feeding amount $Xpg+\Delta R$ corresponds to a feeding amount X10 (where X10>X9) in FIG. 16. When a one-time feeding amount is not corrected from Xpg, the landing range of the ink droplets is extended in the sub-scanning direction D3 due to the high-speed main scanning of the head 61 at the time of the high resolution, and thus there is a possibility of the dark stripes occurring. By increasing the one-time feeding amount to $Xpg+\Delta R$, the dark stripes are suppressed. Accordingly, in the present specific example, it is possible to suppress the banding occurring according to the print resolution along with the platen gap.

The feeding amount can also be changed according to the print resolution along with the record density RD. In this case, the processes of S112, S120, and S130 illustrated in FIG. 8 are performed in S502 and the process of S142 illustrated in FIG. 8 is performed instead of S140. In S152, the signal transmission unit 45 may generate a sub-scanning distance signal indicating the sub-scanning distance $d=Xp0+\Delta X+\Delta R$ obtained by correcting the standard feeding amount Xp0 with the correction values $\Delta X$ and $\Delta R$ and output the sub-scanning distance signal to the sheet feeding mechanism 53.

Further, the feeding amount can also be changed according to the print resolution along with the platen gap (g) and the record density RD. In this case, the halftone process illustrated in FIG. 11 may be performed in S142.

Additionally, the feeding amount may be changed according to only the print resolution irrespective of the platen gap (g) and the record density RD. In this case, it is possible to suppress the banding occurring according to the color of the print resolution.

(10) Specific Examples of Partial Overlap Printing and Pseudo-Band Printing

Figure 18:
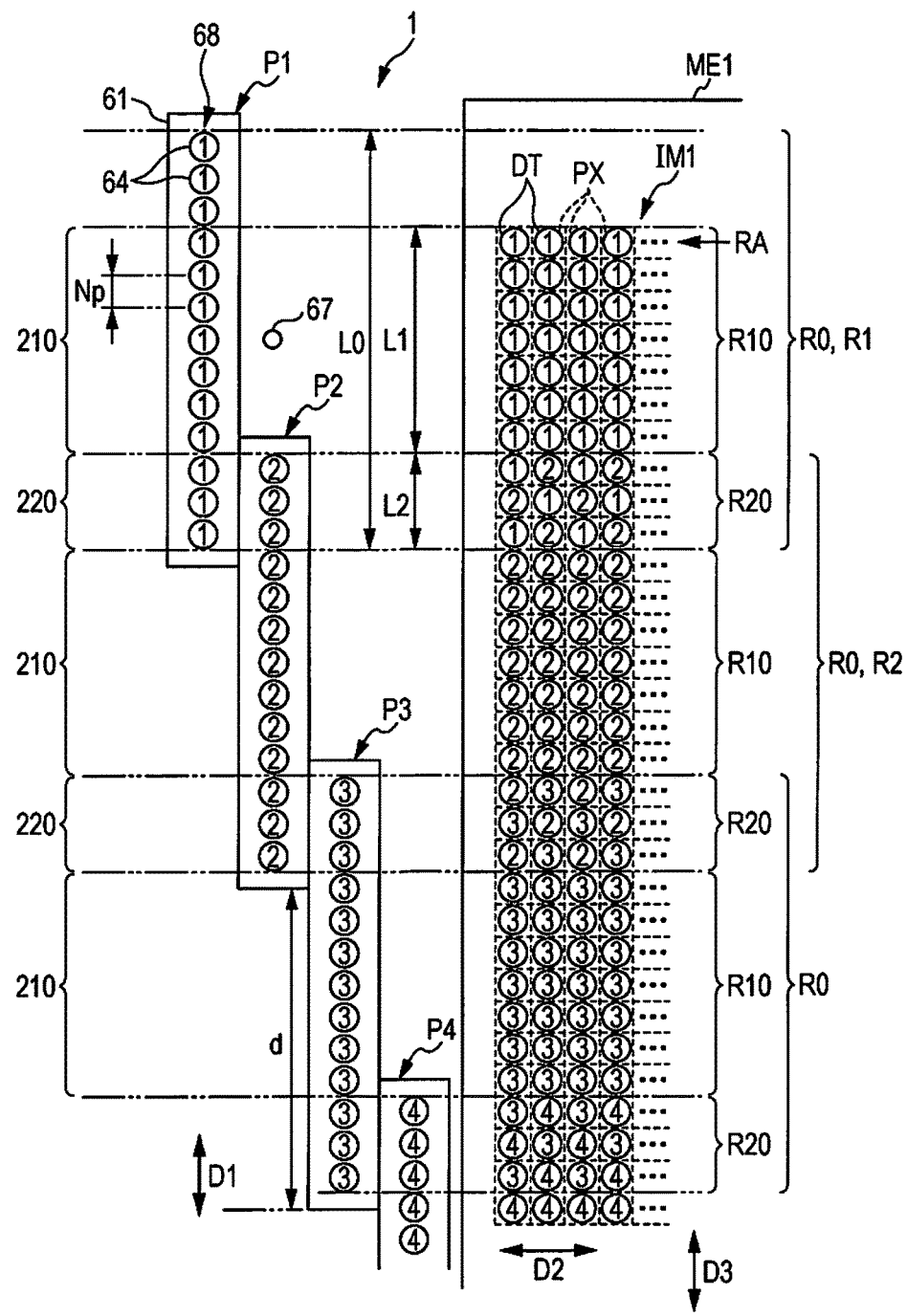
FIG. 18 is a diagram schematically illustrating an operation example of partial overlap printing.

The present technology can also be applied to a case in which overlap printing or pseudo-band printing. First, an operation of a serial printer performing partial overlap printing will be described with reference to FIG. 18. As illustrated in FIG. 18, (L0/2)<d<L0 is satisfied in partial overlap printing when L0 is the length of the nozzle line 68 in the sub-scanning direction D3 and d is a one-time feeding amount of the print substrate ME1 intermittently transported in the sub-scanning direction D3. In the example of FIG. 18, when the transport of the print substrate ME1 is stopped and the head 61 is moved in the main scanning direction D2 to form the dots DT with the ink droplets 67 in the pass P1, the print substrate ME1 is transported by the distance d. Then, in the subsequent pass P2 when the transport of the print substrate ME1 is stopped, the head 61 is moved in the main scanning direction D2 to form the dots DT with the ink droplets 67.

Through the above-described operation, in the nozzles 64 between the adjacent passes, there are an overlap portion 220 in which positions are overlapped in the sub-scanning direction D3 and an independent portion 210 in which positions are not overlapped in the sub-scanning direction D3. Here, the nozzles 64 in the overlap portion 220 are referred to as overlap nozzles. In the print image IM1, the overlap region R20 in which the dots DT are formed in two-time scanning and the independent region R10 in which the dots DT is formed in one-time scanning occur. For example, in the independent region R10 of the pass P1, a dot is formed by the nozzle of circle 1. In the overlap region R20 which is a link portion of the passes P1 and P2, dots are formed by overlap nozzles of circle 1 and circle 2.

When L2 is the length of the overlap portion 220 in the sub-scanning direction D3 and L1 is the length of each of the independent portion 210 in the sub-scanning direction D3, an ideal value of the feeding amount d is L1+L2.

Even in the overlap printing, the landing range of the ink droplets is extended in the sub-scanning direction D3 due to the high-speed main scanning of the head 61. For example, when the landing range of the ink droplets is extended in the sub-scanning direction D3 in a case in which the feeding amount d is set to L1+L2, dots of circles 1 to be formed in the overlap region R20 of the print regions R1 and R2 in the pass P1 are formed in the independent region R10 of the print region R2, or dots of circles 2 to be formed in the overlap region R20 of the print regions R1 an R2 in the pass P2 are formed in the independent region R10 of the print region R1. Further, dots of circles 1 to be formed in the independent region R10 of the print region R1 are formed in the overlap region R20 of the print regions R1 and R2, or dots of circles 2 to be formed in the independent region R10 of the print region R2 are formed in the overlap region R20 of the print regions R1 and R2 in some cases.

As described above, the dark stripes occur in or near the overlap region R20 of the print regions R0. Accordingly, when the present technology is applied even in the case in which the partial overlap printing is performed, deviation of the positions of the above-described dots is suppressed, and thus it is possible to obtain the advantage of suppressing the banding.

Figure 19:
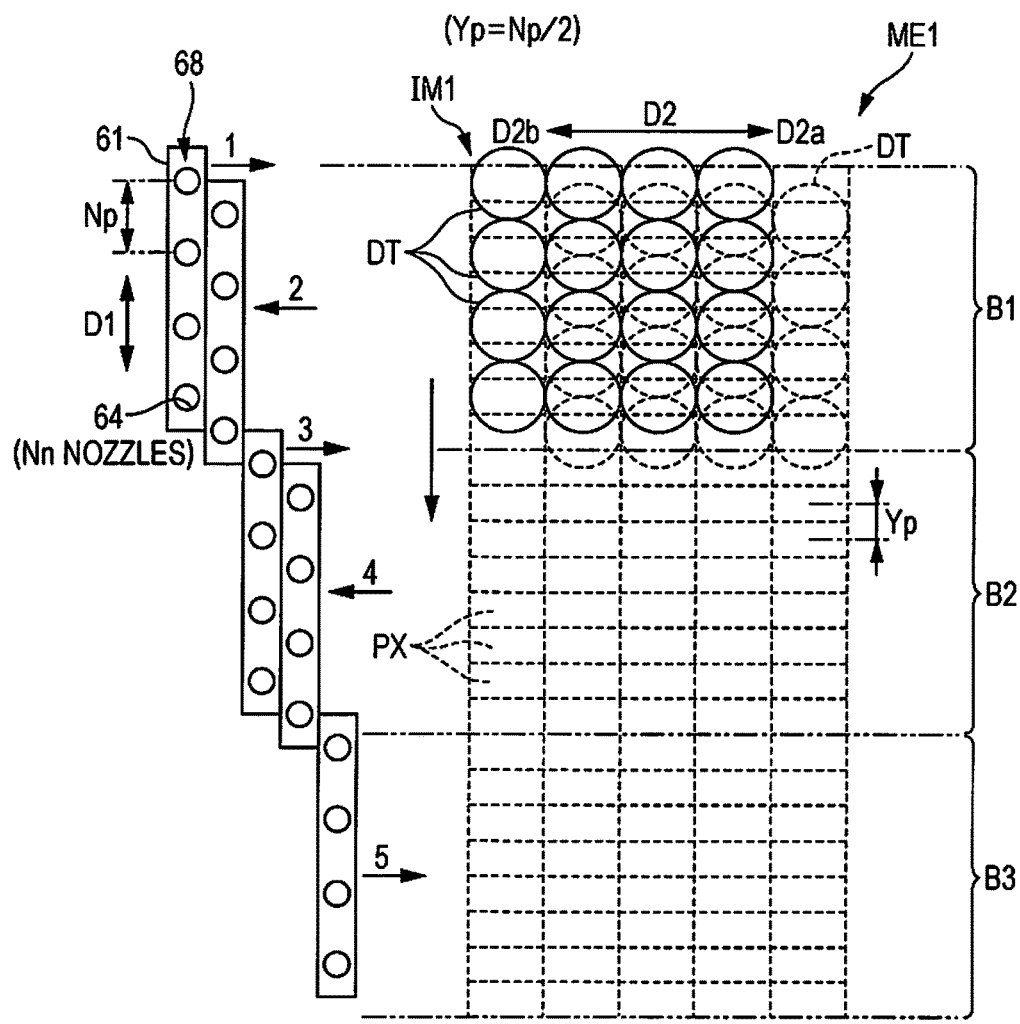
FIG. 19 is a diagram schematically illustrating an operation example of pseudo-band printing.

Next, an operation of a serial printer performing the pseudo-band printing will be described with reference to FIG. 19. As illustrated in FIG. 19, an operation example of the pseudo-band printing rather than the overlap printing will be described. To facilitate the description, the head 61 illustrated in FIG. 19 is assumed to include a nozzle line 68 in which Nn=4 nozzles 64 are arranged at the predetermined pitch Np in the arrangement direction D1.

The pseudo-band printing rather than the overlap printing is a printing scheme of forming all of the dots of the plurality of nozzles 64 and a corresponding one band by moving the head 61 relative to the print substrate ME1 twice or more in the main scanning direction D2. In the example of FIG. 19, a dot DT to be formed for half of a pixel PX included in a band B1 is formed in first main scanning in a forward direction D2a. After the print substrate ME1 is subjected to sheet feeding by a distance of ½ of the nozzle pitch Np, a dot DT to be formed for the remaining half of the pixel included in the band B1 is formed in second main scanning in a backward direction D2b. After the print substrate ME1 is subjected to sheet feeding by a distance of {Nn−(½)}×Np, a dot DT to be formed for half of a pixel PX included in a band B2 is formed in third main scanning in the forward direction D2a. After the print substrate ME1 is subjected to sheet feeding by a distance of (½)×Np, a dot DT to be formed for the remaining half of the pixel included in the band B2 is formed in fourth main scanning in the backward direction D2b. After the print substrate ME1 is subjected to sheet feeding by a distance of {Nn−(½)}×Np, a dot DT to be formed for half of a pixel PX included in a band B3 is formed in fifth main scanning in the forward direction D2a. Subsequently, the same operations are performed. In a case in which uni-directional printing is performed, odd and even dots may be formed and only the main scanning of the forward direction D2a may be performed. A pixel pitch Yp in the sub-scanning direction D3 at the time of the pseudo-band printing is, for example, (½)×Np.

Even in the pseudo-band printing, the landing range of the ink droplets is extended in the sub-scanning direction D3 due to the high-speed main scanning of the head 61 in some cases. For example, when the landing range of the ink droplets is extended in the sub-scanning direction D3 in a case in which the feeding amount d is set to Nn×Np, the band B1 is extended in the sub-scanning direction D3 in the first and second main scanning or the band B2 is extended in the sub-scanning direction D3 in the third and fourth main scanning. For this reason, the bands B1 and B2 are partially overlapped and an overlap portion is shown as dark stripes in some cases. Accordingly, when the present technology is applied even in the case in which the pseudo-band printing is performed, the deviation of the positions of the dots described above is suppressed and it is possible to obtain the advantage of suppressing the banding.

Further, when the present technology is applied even in the case in which pseudo-band printing in which bands are partially overlapped is performed, the deviation of the positions of the dots described above is suppressed and it is possible to obtain the advantage of suppressing the banding.

In the case in which the partial overlap printing or the pseudo-band printing is performed, the banding occurring according to the platen gap can be suppressed, for example, when the distance d of the sub-scanning is changed according to the platen gap. The banding occurring according to the record density can be suppressed when the distance d of the sub-scanning is changed according to the record density. The banding occurring according to the type of print substrate can be suppressed when the distance d of the sub-scanning is changed according to the type of print substrate. The banding occurring according to the color of the print image can be suppressed when the distance d of the sub-scanning is changed according to the color of the print image. The banding occurring according to the print resolution can be suppressed when the distance d of the sub-scanning is changed according to the print resolution.

(11) Modification Examples

Various modification examples of the invention is considered.

For example, the arrangement direction D1 of the nozzles of the nozzle line may be a direction deviated in the sub-scanning direction D3. When θ is an angle formed by the arrangement direction D1 and the sub-scanning direction D3, a pitch of the nozzles in the sub-scanning direction D3 is Np·cos θ.

At least some of the processes illustrated in FIGS. 7 to 9, 11, 13, 15, and 17 may be performed by the host apparatus HT1. For example, in a case in which the host apparatus HT1 performs the processes up to the halftone process and transmits the halftone data and the distance d of the sub-scanning to the printing apparatus 1, the printing apparatus 1 may receive the halftone data and the distance d of the sub-scanning and deliver the halftone data and the distance d of the sub-scanning to the signal transmission unit 45. In this case, the printing apparatus 1 may not include at least some of the resolution conversion unit 41, the color conversion unit 42, the dot distribution unit 43, and the halftone processing unit 44. In a case in which the host apparatus HT1 performs the processes up to the color conversion process and transmits the CMYK data DA3 to the printing apparatus 1, the printing apparatus 1 may receive the CMYK data DA3 and deliver the CMYK data DA3 to the dot distribution unit 43 or the halftone processing unit 44.

The above-described processes may be appropriately changed, for example, by exchanging the sequence of the processes. For example, the process of S302 in the printing control process of FIG. 13 can be performed after the process of S140.

Some or all of a change in the distance d of the sub-scanning according to the platen gap, a change in the distance d of the sub-scanning according to the record density, a change in the distance d of the sub-scanning according to the type of print substrate, a change in the distance d of the sub-scanning according to the color of the print image, and a change in the distance d of the sub-scanning according to the print resolution can be combined arbitrarily.

(12) Conclusion

According to the invention, as described above, it is possible to provide the technology capable of suppressing banding according to various aspects. Of course, even in technologies in which constituent requisites related to dependent aspects of the invention are not included and only constituent requisites related to independent aspects of the invention are included, the above-described basic operations and advantages can be obtained.

Configurations obtained by substituting or combining the configurations disclosed in the above-described embodiment and modification examples and configurations obtained by substituting and combining the configurations disclosed in technologies of the related arts and the above-described embodiment and modification examples can also be embodied. The invention also includes such configurations.

What is claimed is:

1. A printing control device for a printing unit that is capable of adjusting a gap g between a recording head having a nozzle line in which a plurality of nozzles are arranged in a different direction from a main scanning direction and a platen facing the recording head and supporting a print substrate and performs main scanning to move the recording head in the main scanning direction with respect to the print substrate and sub-scanning to move the print substrate in a sub-scanning direction relative to the recording head, the printing control device comprising:

a sub-scanning control unit that controls sub-scanning so that a first sub-scanning distance in a case in which the gap g is a first gap is shorter than a second sub-scanning distance in a case in which the gap g is a second gap broader than the first gap, in the sub-scanning corresponding to band printing scheme or partial overlap printing scheme.

2. The printing control device according to claim 1, wherein the printing unit forms a print image corresponding to print data, wherein the printing control device includes a record density acquisition unit that acquires record density RD of the print image in a specific print region in which the print image is formed at the time of final main scanning before the sub-scanning based on the print data, and wherein the sub-scanning control unit controls the sub-scanning so that a sub-scanning distance in a case in which the record density RD is first record density is shorter than a sub-scanning distance in a case in which the record density RD is second record density higher than the first record density.

3. The printing control device according to claim 1, wherein the printing unit forms a print image corresponding to print data, wherein the printing control device includes a record density acquisition unit that acquires record density RD of the print image in a specific print region in which the print image is formed at the time of final main scanning before the sub-scanning based on the print data, and wherein the sub-scanning control unit acquires a correction value for correcting a standard distance of the sub-scanning based on the record density RD and controls the sub-scanning so that the standard distance becomes a distance corrected by the correction value.

4. The printing control device according to claim 1, further comprising a print substrate type acquisition unit that acquires print substrate type information indicating a type of print substrate supported by the platen, wherein the sub-scanning control unit controls the sub-scanning so that a sub-scanning distance in a case in which the print substrate indicated by the print substrate type information is a first print substrate is shorter than a sub-scanning distance in a case in which the print substrate indicated by the print substrate type information is a second print substrate in which permeation is easier than the first print substrate.

5. The printing control device according to claim 1, wherein the sub-scanning control unit controls the sub-scanning so that a sub-scanning distance in a case in which a color print image is formed is shorter than a sub-scanning distance in a case in which a monochromic print image is formed.

6. The printing control device according to claim 1, wherein the sub-scanning control unit controls the sub-scanning so that a sub-scanning distance in a case in which a print resolution in the sub-scanning direction is a first resolution is shorter than a sub-scanning distance in a case in which the print resolution in the sub-scanning direction is a second resolution higher than the first resolution.

7. A printing control device for a printing unit that is capable of adjusting a gap g between a recording head having a nozzle line in which a plurality of nozzles are arranged in a different direction from a main scanning direction and a platen facing the recording head and supporting a print substrate and performs main scanning to move the recording head in the main scanning direction with respect to the print substrate and sub-scanning to move the print substrate in a sub-scanning direction relative to the recording head, the printing control device comprising:

a sub-scanning control unit that controls a sub-scanning distance in response to the gap g.

* * * * *